US011240466B2

(12) United States Patent
Lee et al.

(10) Patent No.: US 11,240,466 B2
(45) Date of Patent: Feb. 1, 2022

(54) DISPLAY DEVICE, MOBILE DEVICE, VIDEO CALLING METHOD PERFORMED BY THE DISPLAY DEVICE, AND VIDEO CALLING METHOD PERFORMED BY THE MOBILE DEVICE

(71) Applicant: SAMSUNG ELECTRONICS CO., LTD., Suwon-si (KR)

(72) Inventors: Jongin Lee, Suwon-si (KR); Sehyun Kim, Suwon-si (KR); Kwansik Yang, Suwon-si (KR); Kilsoo Choi, Suwon-si (KR); Euna Ko, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/139,570

(22) Filed: Dec. 31, 2020

(65) Prior Publication Data

US 2021/0203878 A1  Jul. 1, 2021

(30) Foreign Application Priority Data

Dec. 31, 2019  (KR) ........................ 10-2019-0179808

(51) Int. Cl.
*H04N 7/14* (2006.01)
*G06F 3/0482* (2013.01)
*H04L 12/18* (2006.01)

(52) U.S. Cl.
CPC ........... *H04N 7/142* (2013.01); *G06F 3/0482* (2013.01); *H04L 12/1831* (2013.01);
(Continued)

(58) Field of Classification Search
CPC ......... H04N 7/14; H04L 12/18; G06F 3/0482; H04M 1/72412; H04M 1/724; H04M 2201/50
(Continued)

(56) References Cited

U.S. PATENT DOCUMENTS 8,738,072 B1 * 5/2014 Messerian ........... H04L 65/1096
455/550.1
2009/0284577 A1  11/2009 Kumar et al.
(Continued)

FOREIGN PATENT DOCUMENTS

EP  2693730 A1  2/2014
EP  3139264 A2  3/2017
(Continued)

OTHER PUBLICATIONS

Communication dated May 10, 2021 issued by the European Patent Office in European Application No. 20217565.9.
(Continued)

*Primary Examiner* — Melur Ramakrishnaiah
(74) *Attorney, Agent, or Firm* — Sughrue Mion, PLLC

(57) ABSTRACT

A display device configured to communicate with a mobile device for video calling. The display device is configured to activate a camera, based on a video calling request received from a mobile device, obtain image data for a counterpart mobile device through a communication interface, and control a display to display a video calling screen image including a first image for the counterpart mobile device generated based on the image data and a second image obtained by the camera.

18 Claims, 28 Drawing Sheets

(52) U.S. Cl.
CPC ... *H04N 7/147* (2013.01); *G06F 2203/04803* (2013.01); *H04N 2007/145* (2013.01)

(58) Field of Classification Search
USPC .......................................... 348/14.01–14.16
See application file for complete search history.

(56) References Cited

U.S. PATENT DOCUMENTS

| | | | |
|---|---|---|---|
| 2010/0216448 A1* | 8/2010 | Jeon .................. | G06F 3/0488 455/418 |
| 2011/0194488 A1* | 8/2011 | Kuo .................. | H04M 1/72412 370/328 |
| 2011/0273526 A1 | 11/2011 | Mehin et al. | |
| 2014/0181886 A1 | 6/2014 | Goodman et al. | |
| 2014/0320584 A1* | 10/2014 | Kumar .................. | H04N 7/147 348/14.03 |
| 2016/0021336 A1* | 1/2016 | Abbott .................. | H04N 7/147 348/14.02 |
| 2017/0155831 A1 | 6/2017 | Jang et al. | |
| 2017/0201790 A1 | 7/2017 | Oh et al. | |
| 2018/0091772 A1 | 3/2018 | Han et al. | |

FOREIGN PATENT DOCUMENTS

| | | |
|---|---|---|
| KR | 10-1076733 B1 | 10/2011 |
| KR | 1020170039629 A | 4/2017 |
| WO | 2017018737 A1 | 2/2017 |

OTHER PUBLICATIONS

International Search Report (PCT/ISA/210) dated Apr. 19, 2021 issued by the International Searching Authority in International Application No. PCT/KR2020/019430.

* cited by examiner

DISPLAY DEVICE, MOBILE DEVICE, VIDEO CALLING METHOD PERFORMED BY THE DISPLAY DEVICE, AND VIDEO CALLING METHOD PERFORMED BY THE MOBILE DEVICE

CROSS-REFERENCE TO RELATED APPLICATION

This application is based on and claims priority under 35 U.S.C. § 119 to Korean Patent Application No. 10-2019-0179808, filed on Dec. 31, 2019, in the Korean Intellectual Property Office, the disclosure of which is incorporated by reference herein in its entirety.

BACKGROUND

1. Field

The disclosure relates to a display device and a mobile device, which are capable of performing video calling, a video calling method performed by the display device, and a video calling method performed by the mobile device.

2. Description of the Related Art

With the development in wired and wireless communication networks, electronic devices that display a screen image and output data visually recognizable by a user may be connected to each other via wired and wireless communication networks.

Electronic devices may transmit data to and receive various pieces of data from each other through the wired and wireless communication networks. In addition, an electronic device may remotely control another electronic device, or an electronic device may be utilized via the other electronic device to perform operations or services.

Examples of the electronic devices connectable to each other via the wired or wireless communication networks may include portable computers (e.g., notebooks, netbooks, or tablet personal computers (PCs)), portable terminals (e.g., smartphones or personal digital assistants (PDAs)), and TVs.

When electronic devices are connected to each other via a communication network, users of the electronic devices may be more conveniently provided with desired services or functions.

Accordingly, there is a demand for a device and a method that enables electronic devices to be connected to each other and utilized, in accordance with requirements and desired services of users to increase a satisfaction level and convenience for the users.

SUMMARY

Provided are a display device, a mobile device, a video calling method performed by the display device, and a video calling method performed by the mobile device, by which a user may more conveniently perform video calling while viewing a video calling screen image.

In detail, provided are a display device, a mobile device, a video calling method performed by the display device, and a video calling method performed by the mobile device, by which a user performs video calling while watching a video calling screen image through the display device having a large-sized screen, compared with the mobile device, thereby increasing the convenience of the user and a satisfaction level of the user.

Additional aspects will be set forth in part in the description which follows and, in part, will be apparent from the description, or may be learned by practice of the presented embodiments of the disclosure.

According to an embodiment of the disclosure, there is provided a display device including a display, a camera, a communication interface configured to communicate with a mobile device, and a processor configured to execute at least one instruction. The processor may be configured to execute at least one instruction to activate the camera, based on a video calling request received from the mobile device, obtain image data of a counterpart mobile device for video calling through the communication interface, and control the display to display a video calling screen image including a first image for the counterpart mobile device generated based on the image data and a second image obtained by the camera.

According to another embodiment of the disclosure, there is provided a mobile device including a display, a camera, a user interface, a communication interface configured to communicate with a display device, and a processor configured to execute at least one instruction. The processor is configured to execute at least one instruction to, in response to the user interface receiving a user input of requesting a video calling screen image to be output through the display device, control the communication interface to transmit a video calling request corresponding to the user input to the display device, and control the display to output a user interface screen image for controlling execution of video calling.

According to another embodiment of the disclosure, there is provided a video calling method performed by a display device including activating a camera of the display device, based on receiving a video calling request from a mobile device, obtaining image data for a counterpart mobile device by the display device, and outputting a video calling screen image to be output through the display device, the video calling screen image including a first image for the counterpart mobile device generated based on the image data and a second image for a user of the mobile device obtained by the camera.

According to another embodiment of the disclosure, there is provided a video calling method performed by a mobile device including receiving a user input of requesting a video calling screen image to be output through a display device, by the mobile device, transmitting a video calling request corresponding to the user input from the mobile device to the display device, and outputting a user interface screen image for controlling execution of video calling, through a display of the mobile device.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
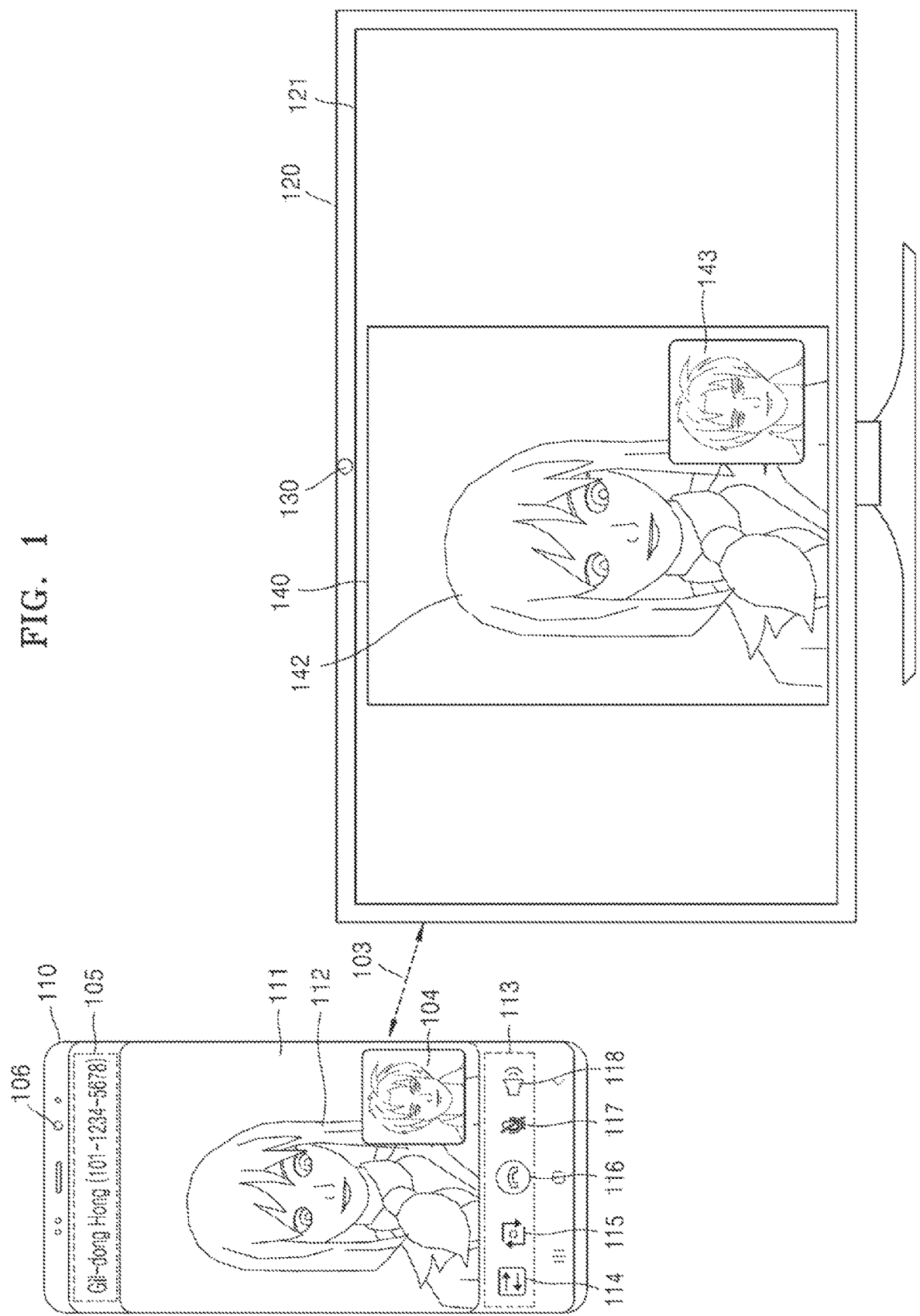
FIG. 1 illustrates a mobile device and a display device connected to each other through a communication network, according to an embodiment of the disclosure.

Embodiments of the disclosure are described in detail herein with reference to the accompanying drawings so that this disclosure may be easily understood by one of ordinary skill in the art to which the disclosure pertains. The disclosure may, however, be embodied in many different forms and should not be construed as being limited to the embodiments set forth herein. In the drawings, parts irrelevant to the description are omitted for simplicity of explanation, and like numbers refer to like elements throughout.

Throughout the specification, when an element is referred to as being "connected" or "coupled" to another element, the element can be directly connected or coupled to the other element, or can be electrically connected or coupled to the other element with intervening elements interposed therebetween. In addition, the terms "comprises" and/or "comprising" or "includes" and/or "including" when used in this specification, specify the presence of stated elements, but do not preclude the presence or addition of one or more other elements.

Thus, the expression "according to some embodiments" or "according to an embodiment" used in the entire disclosure does not necessarily indicate the same embodiment.

Some embodiments may be described in terms of functional block components and various processing steps. Some or all of such functional blocks may be realized by any number of hardware components and/or software modules configured to perform and realize the specified functions. For example, functional blocks according to the disclosure may be realized by one or more processors or microprocessors or by circuit components specifically programmed for a desired function or generally executing software to perform the desired function. In addition, for example, functional blocks according to the disclosure may be implemented with any programming or script language. The functional blocks may be implemented in programmatic algorithms that are executed under the control of one or more processors. Furthermore, the disclosure described herein can employ any number of conventional techniques for electronics configuration, signal processing and/or control, data processing and the like. The words "module," "component," and "configuration" are used broadly and are not limited to mechanical or physical embodiments.

Furthermore, the connecting lines or connectors between components shown in the various Figures are intended to represent exemplary functional relationships and/or physical or logical couplings between the components. Connections between components may be represented by many alternative or additional functional relationships, physical connections or logical connections in a practical device.

In addition, the description of 'at least one of A, B, or C' may mean one of 'A', 'B', 'C', 'A and B', 'A and C', 'B and C', and 'A, B, and C.'

According to an embodiment of the disclosure, provided are a display device, a mobile device, a video calling method performed by the display device, and a video calling method performed by the mobile device, by which a user may more conveniently perform video calling while watching a video calling screen image.

According to an embodiment of the disclosure, an electronic device of a portable type is referred to as a mobile device, user device, or user equipment. An electronic device capable of providing a large screen image through a larger display than a mobile device will be hereinafter referred to as a 'display device.'

In detail, a mobile device refers to a portable electronic device of a user, and may be a wearable device, a smartphone, a tablet PC, a PDA, a laptop computer, a media player, or the like. The display device refers to an electronic device including a display having a larger size than the above-described mobile device and capable of providing a user with a screen image having a larger size than the screen image for the mobile device. For example, the display device may be a TV, a digital TV, a smart TV, a digital signage, or a digital notice.

In the attached drawings, like elements use like reference numerals. In addition, throughout the detailed description, the same components are described with the same terms.

A display device, a mobile device, a video calling method performed by the display device, and a video calling method performed by the mobile device, according to an embodiment of the disclosure, will now be described in detail with reference to the attached drawings.

FIG. 1 illustrates a mobile device and a display device connected to each other through a communication network, according to an embodiment of the disclosure.

A mobile device 110 and a display device 120 may be connected to each other through a wired or wireless communication network. According to an embodiment of the disclosure, a video calling function or a video calling service may be provided using the mobile device 110 and the display device 120.

A communication network 103 connecting the mobile device 110 to the display device 120 refers to a wired and/or wireless communication network capable of transmitting or receiving signals between devices corresponding to certain data. For example, the communication network 103 may be formed according to a wireless network standard such as a local area network (LAN), a wide area network (WAN), a wireless LAN (WLAN) (Wi-Fi), a wireless broadband (Wibro), CDMA, WCDMA, near field communication (NFC), or Bluetooth. The communication network 103 may be a wired network such as an HDMI cable or MHL cable that connects the mobile device 110 to the display device 120 by using a wired cable, or wired Ethernet or fiber optic network.

FIG. 1 illustrates a configuration in which the mobile device 110 is a smartphone of a user and the display device 120 is a TV, in detail, a smart TV. For clarity, FIG. 1 does not illustrate a counterpart device (for example, a mobile device of a counterpart user) that performs video calling with the mobile device 110.

The video calling refers to video calling while watching an image for a counterpart, in detail, a real-time image for the counterpart, through a display. In general, when video calling is performed, an electronic device that performs video calling, for example, the mobile device 110, outputs a video calling screen image 111 including an image for a counterpart, through a display. An operation mode in which video calling is performed will now be referred to as a 'video calling mode.'

Referring to FIG. 1, the video calling screen image 111 may include an image 112 of a counterpart user that is provided by a counterpart apparatus, and at least one image 104 of the user of the mobile device 110.

For convenience of explanation, an image for a counterpart apparatus will now be referred to as a first image, and an image for a user of the mobile device 110 will now be referred to as a second image. In other words, the first image may be an image including at least one of a counterpart user of video calling, a surrounding environment in which the counterpart is located, or an object or environment that the counterpart user wants to show to the user of the mobile device 110. The second image may be an image including at least one of a user of video calling, for example, the user of the mobile device 110, a surrounding environment in which the user is located, or an object or environment that the user wants to show to the counterpart user of video calling.

A configuration in which a counterpart device performing video calling with the mobile device 110 is an electronic device having the same type as the mobile device 110 of FIG. 1 will also be illustrated and described. In other words, the video calling screen image 111 may include a first image 112 and a second image 104.

In detail, the first image may be an image obtained by photographing the face of the counterpart user of video calling through a front side camera of the counterpart device (in detail, corresponding to a front side camera 106 of the mobile device 110). The second image may be an image obtained by photographing the face of the user. According to an embodiment of the disclosure, while a video calling screen image is being output through the display device 120, the second image included in the video calling screen image may be an image obtained through a camera 130 arranged on the front side of the display device 120. While a video calling screen image is being output through the mobile device 110 other than the display device 120, the second image included in the video calling screen image may be an image obtained through the front side camera 106 of the mobile device 110.

The video calling screen image 111 may have various configurations other than the configuration of FIG. 1.

According to an embodiment of the disclosure, when the mobile device 110 and the counterpart device perform video calling, the display device 120 capable of being connected to the mobile device 110 through a wired or wireless communication network may display or replicate a video calling screen image that is output or scheduled to be output by the mobile device 110. Control of a video calling operation may be performed through the mobile device 110.

Referring to FIG. 1, when the mobile device 110 initiates video calling, a screen 121 of the display device 120 may display a video calling screen image 140 corresponding to the video calling screen image 111 that is output or scheduled to be output by the mobile device 110.

In detail, the video calling screen image 140 displayed by the display device 120 may include a second image 143, which is at least one image for the user, and a first image 142, which is at least one image for the counterpart user. For example, the first image 142 and the second image 143 may respectively correspond to the first image 112 and the second image 104. Although FIG. 1 illustrates a configuration in which the first image 142 and the second image 143 are output as a main screen image and a subscreen image of the video calling screen image 140, respectively, the second image 143 and the first image 142 may be output as the main screen image and the subscreen image of the video calling screen image 140, respectively.

While video calling is being performed, the mobile device 110 may output a user interface (UI) screen image for controlling a video calling operation. For convenience of explanation, a UI screen image for controlling a video calling operation will be referred to as a control UI screen image.

The control UI screen image may include one or more menus (for example, 113) for controlling the video calling operation shown in FIG. 1. The one or more menus 113 may include a menu 114 for changing outputting of a video calling screen image between the mobile device 110 and the display device 120, a menu 115 for changing a camera for photographing a user between a front side camera and a back side camera, a menu 116 for terminating video calling, a menu 117 for muting a voice of the user during video calling, and a menu 118 for changing a voice of the user to a speaker and/or earphone output during video calling. Other menu items may be displayed.

One or more menus for controlling video calling may be displayed on the control UI screen image by using at least one of a character, an icon, a drawing, or a symbol. FIG. 1 illustrates and describes a configuration in which a menu for controlling video calling is displayed in the form of an icon on the control UI screen image.

The screen 121 of the display device 120 has a larger size than the screen 111 of the mobile device 110. In general, the display device 120 has high definition performance compared with the mobile device 110. Accordingly, thanks to the advantages of the display device 120 having a large screen and high definition performance compared with the mobile device 110, when the user outputs the video calling screen image that is output or scheduled to be output by the mobile device 110, through the display device 120, the user may more conveniently watch a video calling screen image that the user desires to watch, through a large, high-definition screen.

The mobile device 110 receiving a user input through a touch screen is easier and more convenient to manipulate, than the display device 120 receiving a user input through a remote controller or the like. Therefore, according to an embodiment of the disclosure, the video calling operation may be controlled based on a user input received by the mobile device 110, and thus manipulation convenience of the user during video calling may be improved.

A display device, a mobile device, a video calling method performed by the display device, and a video calling method performed by the mobile device, according to an embodiment of the disclosure, will now be described in more detail with reference to FIGS. 2 through 28.

Figure 2:
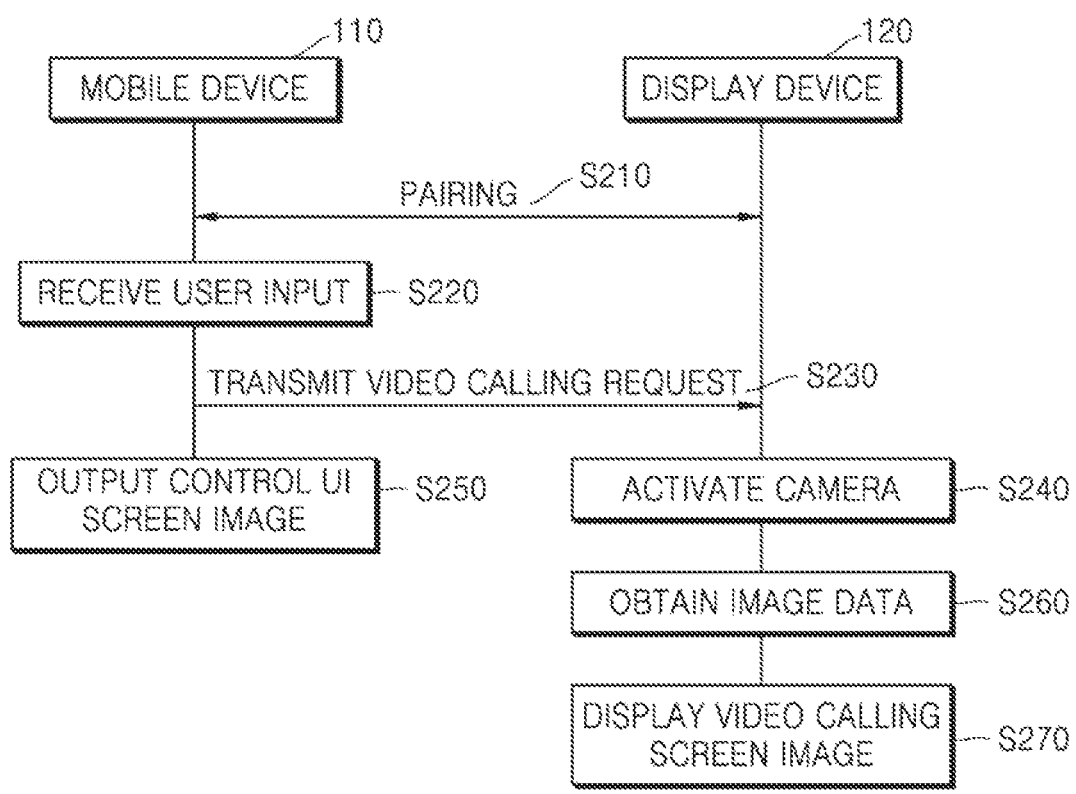
FIG. 2 is a flowchart of a video calling method according to an embodiment of the disclosure.

FIG. 2 is a flowchart of a video calling method according to an embodiment of the disclosure. FIG. 2 is a flowchart for explaining operations that are performed by the mobile device or the display device according to an embodiment of the disclosure. The same components of FIG. 2 as the components of FIG. 1 are indicated by the same reference numerals or characters. Thus, a redundant description thereof is omitted in the description of the video calling method illustrated in FIG. 2.

Referring to FIG. 2, the mobile device 110 and the display device 120 may be connected to each other via a wired or wireless communication network (for example, 103 of FIG. 1). In detail, the mobile device 110 and the display device 120 may transmit or receive a signal and/or data through the wired or wireless communication network (for example, 103 of FIG. 1).

The communication connection between the mobile device 110 and the display device 120 may be performed before video calling is performed or simultaneously with a request to perform video calling.

In other words, to perform a video calling operation according to an embodiment of the disclosure, the mobile device 110 and the display device 120 need to be connected to each other via the wired or wireless communication network. When wired communication connection between the mobile device 110 and the display device 120 is achieved using a cable or the like, a video calling service may start without a special pairing operation (for example, operation S210) between the mobile device 110 and the display device 120.

When the mobile device 110 and the display device 120 are connected to each other via the wireless communication network, the mobile device 110 and the display device 120 may perform pairing operation for forming performing wireless communication. In detail, when the video calling operation according to an embodiment of the disclosure starts, the mobile device 110 and the display device 120 may perform pairing operation.

The pairing operation may refer to an operation of forming a wireless communication network while transmitting or receiving pieces of data necessary for wireless communication connection between the mobile device 110 and the display device 120 so that a video calling screen image corresponding to video calling initiated by the mobile device 110 is output through the display device 120. When the pairing is completed, the mobile device 110 and the display device 120 may transmit or receive pieces of data necessary for performing video calling.

FIG. 2 illustrates a configuration in which the mobile device 110 and the display device 120 are connected to each other via the wireless communication network through a pairing operation, and a configuration in which a pairing operation S210 is performed before video calling starts.

When the wireless communication network between the mobile device 110 and the display device 120 has already been performed, the above-described pairing operation may be omitted.

When the mobile device 110 and the display device 120 have ever executed a mirroring service before, pairing between the mobile device at a previous time point and the display device 120 is performed at the above-described previous time point. When video calling is requested at a subsequent time point, communication connection between the mobile device 110 and the display device 120 may be formed using pieces of data obtained during previous pairing operation and necessary for wireless communication connection.

According to an embodiment of the disclosure, the mobile device 110 receives a user input of requesting the video calling screen image to be output via the display device 120 (S220).

In detail, the mobile device 110 may display a UI screen image including a menu requesting the video calling screen image to be output through the display device 120. Then, the user may select a displayed menu by using a method such as touching, and the mobile device 110 may recognize an input of the user and thus may recognize a user input of requesting the video calling screen image to be output through the display device 120.

Operation S220 will be described in detail with reference to FIGS. 7 and 8.

According to an embodiment of the disclosure, the mobile device 110 transmits the video calling request to the display device 120, based on the user input received in operation S220 (S230). In detail, the mobile device 110 may transmit the video calling request to the display device 120, in correspondence with the user input received in operation S220. Accordingly, the display device 120 may receive the video calling request.

The video calling request may be a request for the user of the mobile device 110 to perform video calling with the counterpart user while watching the screen of the display device 120. In detail, the video calling request may be a request for the display device 120 to take over and instead execute the video calling initiated by the mobile device 110. In other words, the video calling request may be a request made for the video calling screen image corresponding to the video calling initiated by the mobile device 110 to be output via a display of the display device 120. Accordingly, when an execution subject of video calling is changed from the mobile device 110 to the display device 120, the video calling screen image may be consecutively output from the mobile device 110 to the display device 120 without stoppage.

In detail, the video calling request may be a request made for the display device 120 to capture an image for the user and a video calling screen image including the captured image and an image for the counterpart to be output via the display device 120. In detail, when video calling is performed, the image for the user and the image for the counterpart may become images captured in real time while video calling is being performed.

Alternatively, the video calling request may be a request made for video calling initiated by the mobile device 110 to be instead performed through the display device 120. When the display device 120 performs video calling instead, execution of video calling by the display device 120 may accompany an operation of generating and outputting display of the video calling screen image.

The mobile device 110 may output a control UI screen image, which is a UI screen image for controlling execution of video calling, through the display (S250). The control UI screen image will be described in detail with reference to FIG. 9.

The display device 120 activates a camera included in the display device 120, based on the video calling request received from the mobile device 110 (S240). At this time, the display device 120 may select a camera usable for video calling by the display device 120 from among cameras included in the display device 120, connected to the display device 120 by wires, or connected to the display device 120 wirelessly. The display device 120 may display a camera list usable for video calling, and may select one camera according to a selection by the user.

The camera included in the display device 120 may be arranged at one location on the front surface of the display device 120 to photograph the front side of the screen of the display device 120. Referring to FIG. 1, the camera 130 of the display device 120 may be arranged at the upper center on the front side of the display device 120 as shown in FIG. 1. In detail, the camera 130 of the display device 120 may be arranged at one location on the front side of the display device 120 to obtain an image for the user who watches a screen image output by the display device 120 on the front surface of the display device 120. FIG. 1 illustrates a configuration in which one camera is included in the display device 120. However, the display device 120 may include a plurality of cameras arranged on different locations. When the display device 120 includes a plurality of cameras, the user may select one of the plurality of cameras so that the display device 120 performs video calling, based on self setting or a user input.

The camera for obtaining an image for the user may be an external camera included separately from the display device 120, instead of being integrated in the display device 120. For example, the camera may be an external camera arranged on one lateral surface of the display device 120 to photograph the front side of the display device 120. In this configuration, the external camera and the display device 120 may be connected to each other through wired or wireless communication, and the external camera may obtain an image for the user of video calling under the control of the display device 120.

Activating a camera may refer to setting an operational state of the camera to a state in which image capture is performed through the camera. Accordingly, when the camera is activated, image capture through the activated camera may be performed, and a signal for the image obtained through the camera may be received from the activated camera.

In detail, when an operating mode of the display device 120 is a video calling mode or a photographing mode, the camera may be activated to obtain an image, thereby performing image capture.

According to an embodiment of the disclosure, the display device 120 may obtain an image for the user through the camera by activating the camera (for example, the camera 130 of FIG. 1), based on the video calling request S230.

Subsequently, the display device 120 may obtain image data for the counterpart of video calling (S260). In detail, the display device 120 may receive image data for the counterpart of video calling through a communication interface of the display device 120. The image data for the counterpart may be data for generating the image (for example, 142 of FIG. 1) of the counterpart included in the video calling screen image (for example, 140 of FIG. 1). Operation S260 will be described in detail with reference to FIGS. 12 through 16.

The display device 120 may display, through the display (for example, 121 of FIG. 1), a video calling screen image (for example, 140 of FIG. 1) including a first image for the counterpart generated based on the image data obtained in operation S260 and a second image for the user obtained by the camera of the display device 120 (S270).

An embodiment of the disclosure has been described in brief with reference to FIGS. 1 and 2.

The mobile device 110, the display device 120, the video calling method performed through the mobile device 110, and the video calling method performed through the display device 120, according to an embodiment of the disclosure, will now be described in detail with reference to FIGS. 3 through 28.

Figure 3:
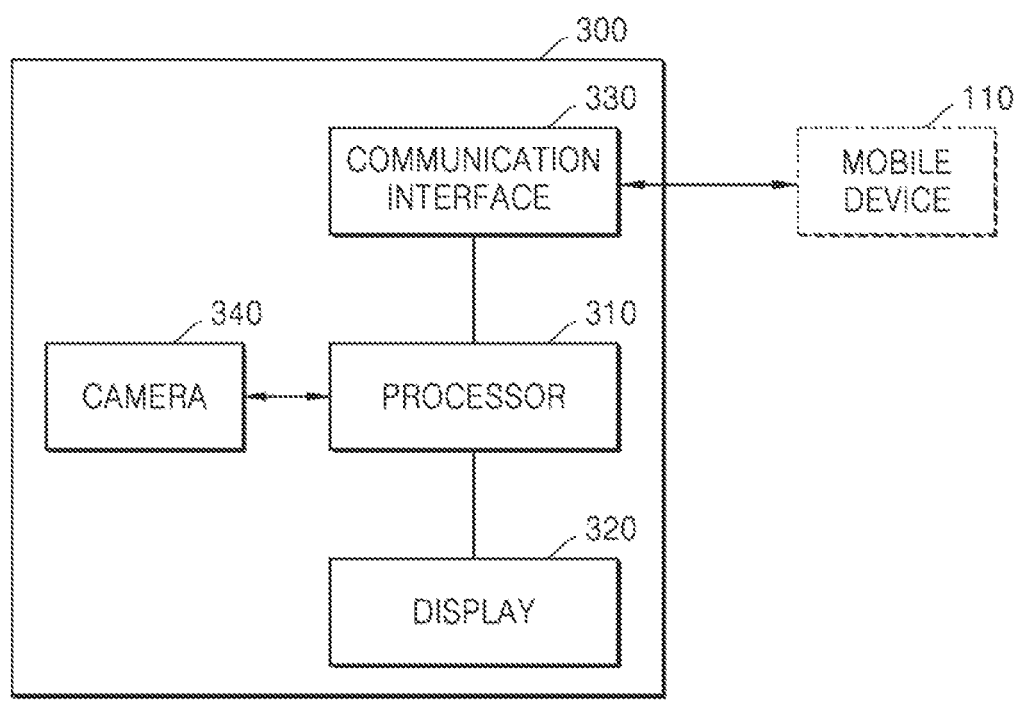
FIG. 3 is a block diagram of a display device according to an embodiment of the disclosure.

FIG. 3 is a block diagram of a display device 300 according to an embodiment of the disclosure.

In the accompanying drawings, the same reference symbols refer to the same components. Accordingly, a mobile device 110 illustrated in FIG. 3 may correspond to the mobile device 110 described above with reference to FIG. 1. The display device 300 illustrated in FIG. 3 may correspond to the display device 120 described above with reference to FIGS. 1 and 2. Accordingly, descriptions of the display device 300 that are the same as those made with reference to FIGS. 1 and 2 are not repeated herein.

Referring to FIG. 3, the display device 300 includes a processor 310, a display 320, a communication interface 330, and a camera 340.

The processor 310 executes at least one instruction to control a desired operation to be performed. Here, the at least one instruction may be stored in an internal memory included in the processor 310 or a memory included in the display device 300 separate from the processor 310.

In detail, the processor 310 may execute the at least one instruction to control at least one component included in the display device 300 to perform a desired operation. Thus, even in a configuration in which the processor 310 performs certain operations is illustrated and described, the above-mentioned configuration may also represent that the processor 310 controls the at least one component included in the display device 300 to perform the operations.

Although a configuration in which the processor 310 includes only one processor has been illustrated and described, the processor 310 may be implemented to include a plurality of processors.

In detail, the display device 300 may include RAM that stores a signal or data input by an external source of the display device 300 or is used as a storage region for various operations performed by the display device 300, ROM that stores a control program and/or a plurality of instructions for controlling the display device 300, and at least one processor. The display device 300 may include a graphics processing unit (GPU) for performing video graphics processing. The processor 310 may be implemented as a system-on-chip (SoC) including a core and a GPU. The processor 310 may include a multi-core rather than a single-core. For example, the processor 310 may include a dual core, a triple core, a quad core, a hexa core, an octa core, a deca core, a dodeca core, a hexadecimal core, or the like.

The display 320 outputs an image on a screen. In detail, the display 320 may output an image corresponding to video data through a display panel included in the display 320, so that a user may visually recognize the video data.

According to the disclosed embodiment, while video calling is being performed, the display 320 may output a video calling screen image for video calling.

The communication interface 330 communicates with another electronic device through at least one wired or wireless communication network. According to an embodiment of the disclosure, the communication interface 330 communicates with the mobile device 110.

The communication interface 330 may communicate with the mobile device 110 via a wired and/or wireless communication network. In detail, the communication interface 330 may include at least one communication module, communication circuit, antenna, or the like, and may transmit or receive data to or from an external electronic device or a server through the communication module and/or the communication circuit.

In detail, the communication interface 330 may include at least one short-range wireless communication module performing communication according to a communication standard, such as Bluetooth, Wifi, Bluetooth low energy (BLE), near-field communication (NFC)/radio-frequency identification (RFID), Wifi-direct, ultra-wideband (UWB), or Zigbee. Here, the short-range wireless communication module may also be referred to as a short-range wireless communication interface.

The communication interface 330 may further include a remote communication module performing communication with a server for supporting remote communication according to a remote communication standard. In detail, the communication interface 330 may include the remote communication module performing communication through a network for Internet communication. The communication interface 330 may include a communication network that follows the communication standards, such as 3G, 4G, and/or 5G. The remote communication module may also be referred to as a remote communication interface.

The communication interface 330 may include at least one port, through which the communication interface 330 may be connected to the mobile device 110 by using wired cables, so that the communication interface 330 may communicate with the mobile device 110 based on a wired communication method. For example, the communication interface 330 may include a cable connection port, such as an HDMI port or Ethernet port.

The camera 340 may correspond to the camera 130 of FIG. 1. The camera 340 may include an image sensor such as a charge-coupled device (CCD) sensor, and may obtain an image frame, such as a still image or a moving picture, via an image sensor in a video call mode or a photography mode.

FIG. 3 illustrates a configuration in which one camera is included in the display device 300. However, the display device 300 may include a plurality of cameras arranged on different locations. When the display device 300 includes a plurality of cameras, the user may select one of the plurality of cameras so that the display device 300 performs video calling, based on self setting or a user input.

The camera for obtaining an image for the user may be external to the display device 300, instead of being integrated in the display device 300. For example, the camera may be an external camera arranged on or adjacent to one lateral surface of the display device 120 to photograph the front side of the display device 120. In this configuration, the external camera and the display device 300 may be connected to each other through wired or wireless communication, and the external camera may obtain an image for the user of video calling under the control of the display device 300.

For convenience of explanation, a configuration in which a camera for obtaining an image for a user to achieve video calling is included in the display device 300 will now be described.

According to an embodiment of the disclosure, the processor 310 may activate the camera 340, based on the video calling request received from the mobile device 110. The processor 310 may obtain the image data for the user through the activated camera 340. Continuously, the processor 310 may control the video calling screen image including the first image for the counterpart generated based on the image data for the counterpart and the second image obtained by the camera 340 to be output through the display 320.

Hereinafter, components of the display device 300 will be described in more detail later by referring to FIG. 4.

Figure 4:
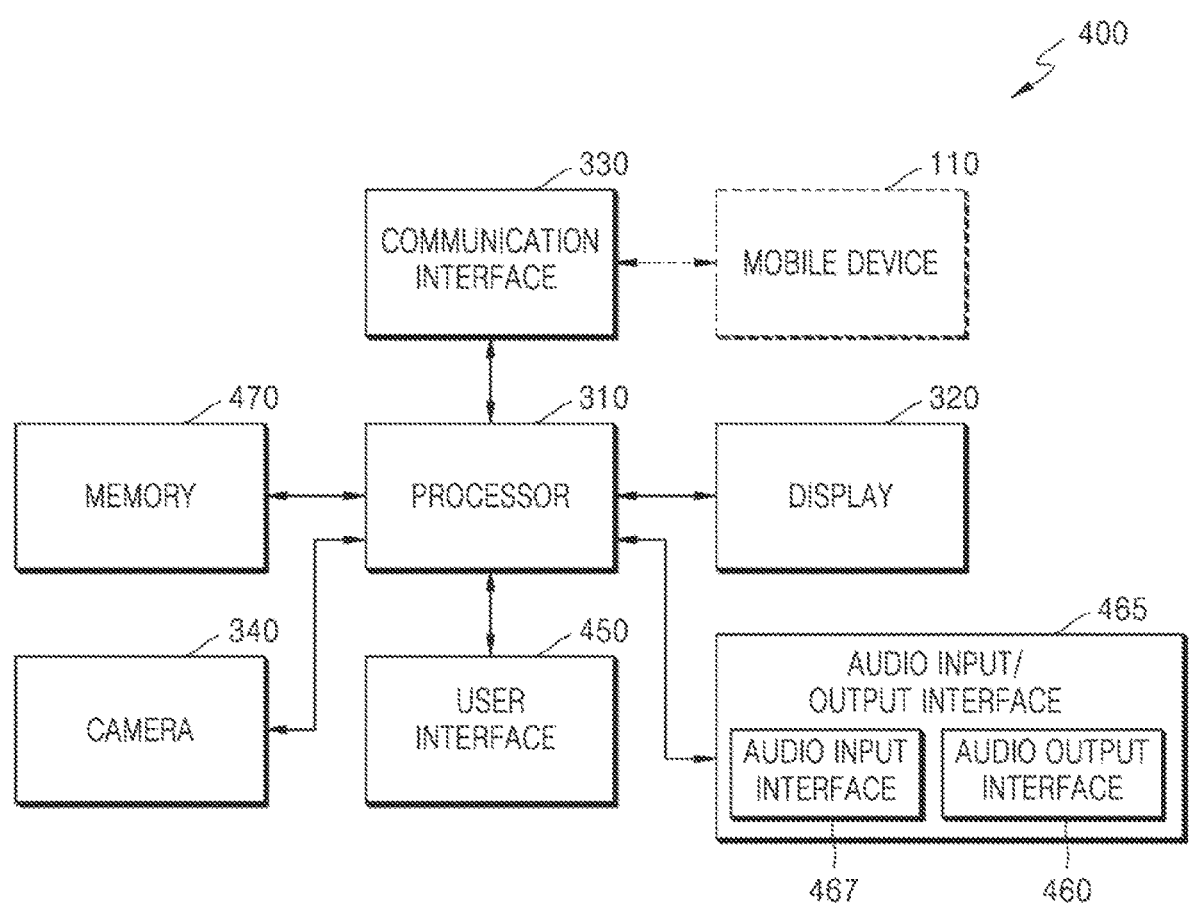
FIG. 4 is a block diagram of a display device according to an embodiment of the disclosure.

FIG. 4 is a block diagram of a display device 400 according to an embodiment of the disclosure.

The display device 400 illustrated in FIG. 4 may correspond to the display devices 120 and 300 illustrated in FIGS. 1 through 3. Referring to FIG. 4, the display device 400 may further include at least one of a memory 470, a user interface 450, or an audio input/output interface 465, as compared to the display device 300.

The memory 470 may store one or more instructions, which may include data and one or more software and application programs. The memory 470 may store one or more instructions that are executed by the processor 310. The memory 470 may store one or more programs that are executed by the processor 310.

In detail, the memory 470 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk.

The user interface 450 may receive a user input for controlling the display device 400. The user interface 450 may include, but is not limited to, user input devices including a touch panel that senses a touch of a user, a hardware button or switch that receives a push manipulation of the user, a wheel that receives a rotation manipulation of the user, a key board, and a dome switch.

The user interface 450 may also include a voice recognition device. For example, the voice recognition device may include a microphone and a voice recognition engine for converting speech to text. The voice recognition device may receive a user's voice command or voice request. Accordingly, the processor 310 may control an operation corresponding to the voice command or the voice request to be performed.

The user interface 450 may also include a motion detection sensor. For example, the motion detection sensor may detect a motion of the display device 400 and receive the detected motion as a user input. The voice recognition device and the motion detection sensor described above may not be included in the user interface 450. Rather, the voice recognition device and the motion detection sensor may be included in the display device 400 as modules separate from the user interface 450.

The audio input/output interface 465 may audibly output audio data recognizable by a user, or may detect and/or receive audio data. In detail, the audio input/output interface 465 may include an audio output interface 460 and an audio input interface 467.

The audio output interface 460 may be a speaker that outputs audio under the control of the processor 310.

In detail, the audio output interface 460 may output audio (for example, a voice or a sound) that is input via the communication interface 330.

According to an embodiment of the disclosure, the processor 310 may control audio received from a counterpart device of video calling to be output through the audio output interface 460 during a video calling mode.

The audio output interface 460 may also output audio stored in the memory 470 under the control of the processor 310. The audio output interface 460 may include at least one selected from a speaker, a headphone output port, or a Sony/Philips Digital Interface (S/PDIF) output port. The audio output interface 460 may include a combination of the speaker, the headphone output port, and the S/PDIF output port.

The audio input interface 467 receives audio. In detail, the audio input interface 467 may include a microphone that receives audio that is an external sound signal and processes the received audio into electrical audio data. For example, the microphone included in the audio input interface 467 may receive a sound signal from an external device or a speaker, for example, a user who is under video calling. The microphone included in the audio input interface 467 may employ various noise removal algorithms to remove noise that is generated while receiving the external audio signal.

According to an embodiment of the disclosure, under the control of the processor 310, the audio input interface 467 may receive a sound signal including a voice of the user and may remove noise from the received sound signal so that the voice of the user is recognized, in a video calling mode.

Figure 5:
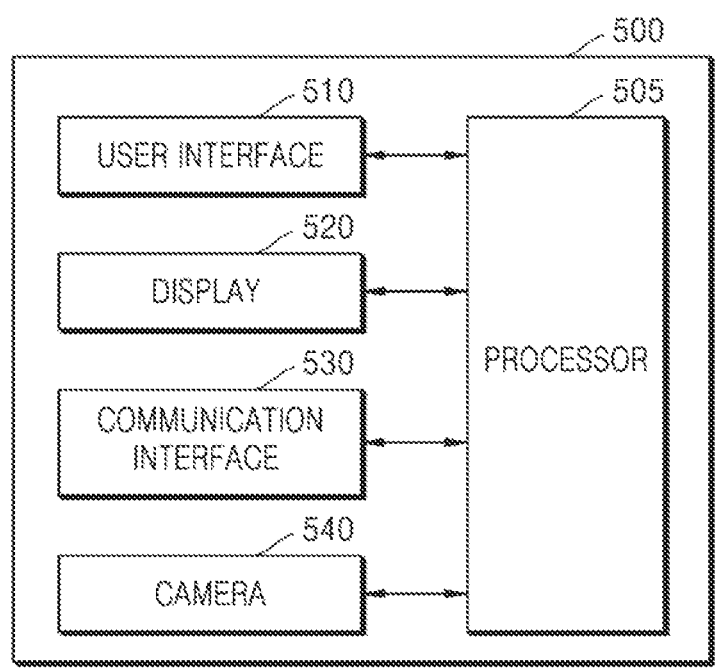
FIG. 5 is a block diagram of a mobile device according to an embodiment of the disclosure.

FIG. 5 is a block diagram of a mobile device 500 according to an embodiment of the disclosure.

The mobile device 500 illustrated in FIG. 5 may correspond to the mobile device 110 described above with reference to FIGS. 1 through 4. Accordingly, when describing the mobile device 500, operations thereof that are the same as the operations of the mobile device 110 described with reference to FIGS. 1 through 4 will not be redundantly described.

Referring to FIG. 5, the mobile device 500 includes a processor 505, a user interface 510, a display 520, a communication interface 530, and a camera 540.

The processor 505 may execute at least one instruction to control a desired operation to be performed. Here, the at least one instruction may be stored in an internal memory included in the processor 505 or a memory included in the mobile device 500 separate from the processor 505.

In detail, the processor 505 may execute the at least one instruction to control at least one component included in the mobile device 500 to perform a desired operation. Thus, even when a configuration in which the processor 505 performs certain operations is illustrated and described, the above-mentioned configuration may also represent that the processor 505 controls the at least one component included in the mobile device 500 to perform the operations.

The display 520 outputs an image on a screen. In detail, the display 520 may output an image corresponding to video data through a display panel included in the display 520, so that a user may visually recognize the video data.

The display 520 may further include a touch pad coupled with the display panel. When the display 520 is formed as the display panel coupled with the touch pad, the display 520 may output a user interface screen for receiving a touch input. When a user manipulation (for example, a touch operation) corresponding to a certain command is detected on the user interface screen, the display 520 may transmit the detected touch input to the processor 505. Then, the processor 505 interprets the detected touch input to thereby recognize and execute the command input by a user.

A configuration in which the display 520 has a shape in which the display panel and the touch panel are combined will now be described. According to an embodiment of the disclosure, the display 520 may output a control UI screen image that is a UI screen image for controlling a video calling operation under the control of the processor 505, while the video calling screen image is being output through a display device (for example, 300) connected to the mobile device 500 through the wired or wireless communication network.

The communication interface 530 communicates with another electronic device or a server through at least one wired or wireless communication network.

According to an embodiment of the disclosure, the processor 505 may control the communication interface 530 to be connected to a server for supporting video calling, so that video calling between the mobile device 500 and the counterpart device may be achieved in the video calling mode. Accordingly, the communication interface 530 may transmit or receive data necessary for performing video calling.

According to an embodiment of the disclosure, the communication interface 530 communicates with the display device (for example, 120, 300, or 400) through wired or wireless communication. In detail, the processor 505 may be connected to the display device (for example, 120, 300, or 400) through the communication interface 530 via the wired or wireless communication network so that the video calling screen image is output via the display device (for example, 120, 300, or 400).

In detail, the communication interface 530 may include at least one short-range wireless communication module performing communication according to a communication standard, such as Bluetooth, Wifi, Bluetooth low energy (BLE), near-field communication (NFC)/radio-frequency identification (RFID), Wifi-direct, ultra-wideband (UWB), or Zigbee.

The communication interface 530 may further include a remote communication module performing communication with a server for supporting remote communication according to a remote communication standard. In detail, the communication interface 530 may include the remote communication module performing communication through a network for Internet communication. The communication interface 530 may include a communication network that follows the communication standards, such as 3G, 4G, and/or 5G. The remote communication module may also be referred to as a mobile communication module.

For example, the communication interface 530 may be connected to the server for supporting video calling, through a communication network that follows the 5G communication standard. Accordingly, the mobile device 500 may provide a video calling service with the counterpart device.

The communication interface 530 may include at least one port, through which the communication interface 530 may be connected to the display device (e.g., 120, 300, or 400) by using wired cables, so that the communication interface 530 may communicate with the display device (e.g., 120, 300, or 400) based on a wired communication method. For example, the communication interface 530 may include a cable connection port, such as an HDMI port, an Ethernet or fiber optic port, or a USB connection port.

The user interface 510 may receive a user input for controlling the mobile device 500. The user interface 510 may include, but is not limited to, user input devices including a touch panel that detects a tough of a user, a button that receives a push manipulation of the user, a wheel that receive a rotation manipulation of the user, a key board, and a dome switch. The button, the wheel, and the dome switch may be formed with keys respectively corresponding to different functions.

The user interface 510 may also include a voice recognition device. For example, the voice recognition device may include a microphone. The voice recognition device may receive a user's voice command or voice request. Accordingly, the processor 505 may control an operation corresponding to the voice command or the voice request to be performed.

The user interface 510 may also include a motion detection sensor. For example, the motion detection sensor may detect a motion of the user within a vehicle and receive the detected motion as a user input. The voice recognition device and the motion detection sensor described above may not be included in the user interface 510. Rather, the voice recognition device and the motion detection sensor may be included in the mobile device 500 as components or modules separate from the user interface 510.

The camera 540 may include an image sensor, and may obtain an image frame, such as a still image or a moving picture, via an image sensor in a video call mode or a photography mode.

The camera 540 may include one or more cameras formed at different locations. For example, the camera 540 may include a front side camera and a back side camera. The front side camera is the same as the front side camera 106 of FIG. 1, and thus a redundant description thereof will be omitted. The back side camera may have a field of view which is opposite to a field of view of the front side camera 106, and may photograph the back side of the mobile device 500. For example, the back side camera may have a field of view which direction has 180 degrees different from the field of view of the front side camera 106.

For example, the processor 505 activates the camera 540, in detail, the front side camera, when video calling is requested. The processor 505 may obtain the image data for the user through the front side camera.

According to an embodiment of the disclosure, when the processor 505 controls the video calling screen image to be output by the mobile device 500 other than the display device (for example, 120, 300, or 400), the processor 505 may control the camera 540 to be activated so that the camera 540 performs image capturing operation.

A video calling operation performed by the mobile device (for example, 110 or 500) and the display device (for example, 120, 300, or 400) and an operation of controlling video calling, according to an embodiment of the disclosure, will now be described in detail with reference to FIGS. 6 through 26.

Figure 6:
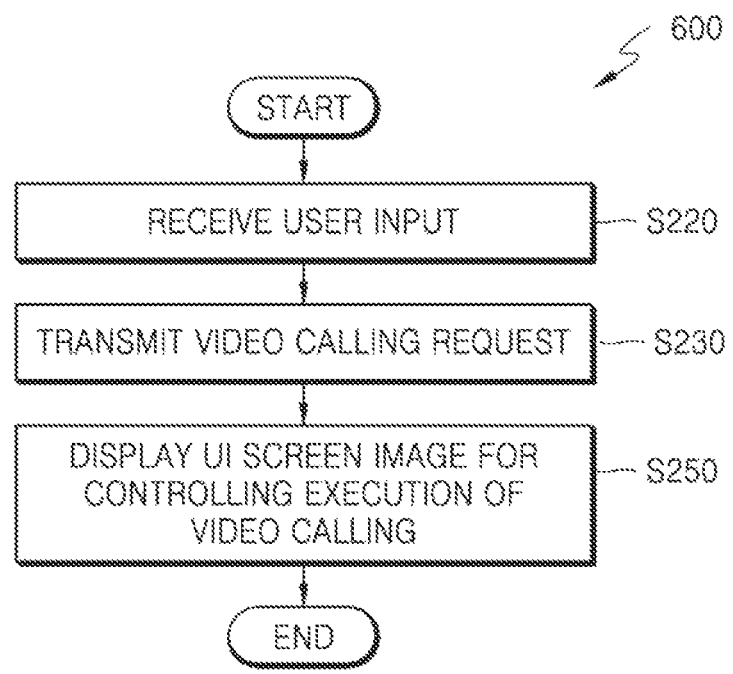
FIG. 6 is a flowchart of a video calling method performed by a mobile device, according to an embodiment of the disclosure.

FIG. 6 is a flowchart of a video calling method 600 performed by a mobile device, according to an embodiment of the disclosure.

Operations or steps of FIGS. 6 through 26 that are the same as those included in the video call method of FIG. 2 are illustrated with the same reference characters or symbols as in FIG. 2. For example, operation S230 of FIG. 6 corresponds to operation S230 of FIG. 2. Accordingly, a redundant description given above with reference to FIG. 2 will be omitted in the description of the operations or steps performed in an embodiment of the disclosure with reference to FIGS. 6 through 26.

The mobile device 500 of FIG. 5 and the display device 400 of FIG. 4 will be referred to in the following description of an embodiment of the disclosure with reference to FIGS. 6 through 26.

Referring to FIG. 6, the video calling method 600 is performed through a mobile device according to an embodiment of the disclosure, for example, the mobile device 500. FIG. 6 may be a flowchart illustrating operations performed by the mobile device according to an embodiment of the disclosure, for example, the mobile device 500.

Referring to FIG. 6, the mobile device 500 receives a user input of requesting the video calling screen image to be output through the display device 400 (S220). In detail, the processor 505 of the mobile device 500 may receive the user input via the user interfaces 510. In detail, the processor 505 may identify to which request a content detected by the user interface 510 corresponds, based on a user's manipulation (for example, a user's touch for selecting a certain menu) that is detected through the user interface 510. Operation S220 will now be described in detail with reference to FIGS. 7 and 8.

Figure 7:
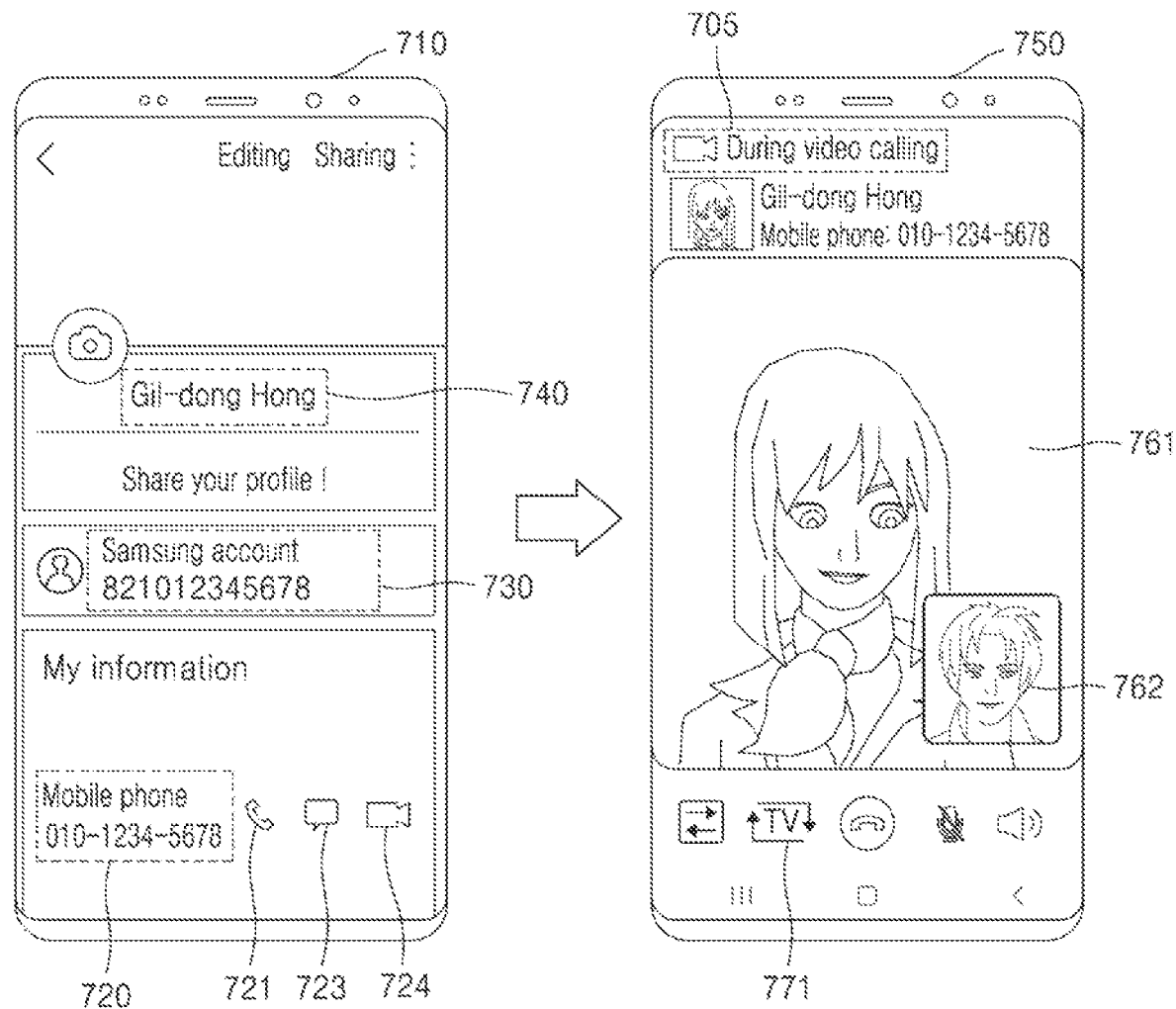
FIG. 7 illustrates user interface (UI) screen images output by a mobile device, according to an embodiment of the disclosure.

FIG. 7 illustrates UI screen images output by a mobile device according to an embodiment of the disclosure.

Referring to FIG. 7, the mobile device 500 may display a UI screen image 710. In detail, the processor 505 of the mobile device 500 may control the UI screen image 710 including a menu 724 requesting video calling to be displayed on the display 520.

In detail, the UI screen image 710 may be a screen image representing a contact number of the counterpart or the counterpart device. The UI screen image 710 may include at least one of a name 740 of the counterpart, contact information 730 for a social network of the counterpart, or a mobile phone number 720 of the counterpart. The mobile phone number 720 is illustrated as an example of communication contact information for connection with the counterpart device to talk with the counterpart. The UI screen image 710 may include information used for connection with the counterpart device to transmit or receive data necessary for calling or video calling, in addition to the mobile phone number 720.

In addition to the pieces of information of FIG. 7, the UI screen image 710 may include an image corresponding to the counterpart, additional information for the counterpart, memos associated with the counterpart, and the like.

Referring to FIG. 7, the UI screen image 710 may further include at least one of a menu 721 requesting wired calling or a menu 723 for transmitting or receiving a text message, in addition to the menu 724 requesting for video calling. The menus 721, 723, and 724 corresponding to certain requests may be displayed using at least one of a character, an icon, a drawing, and a symbol. FIG. 7 illustrates a configuration in which the menus 721, 723, and 724 corresponding to certain requests are displayed in the form of icons within the UI screen image 710.

The user may touch the menu 724 requesting for video calling, which is displayed on the UI screen image 710. Then, the processor 505 may identify that a user's request is a request for video calling, based on a user's touch, and may perform an operation corresponding to the identified request.

In response to a user input for the menu 724, the processor 505 may perform video calling and may control an interface screen image 750 for video calling to be displayed. In other words, in response to a user input for the menu 724, the processor 505 may control the UI screen image 710 to be changed to the interface screen image 750 and the interface screen image 750 to be displayed.

For example, the interface screen image 750 for video calling may include an image 761 of the counterpart so that the user may perform calling while watching an image for the counterpart. The interface screen image 750 may further include an image 762 of the user.

According to an embodiment of the disclosure, the interface screen image 750 may further include a menu 771 requesting the video calling screen image to be output through the display device 400 connected to the mobile device 500.

For convenience of explanation, a request made for the video calling screen image to be output through the display device 400 connected to the mobile device 500 will now be referred to as a 'request for calling through a TV.' In other words, the menu 771 refers to a menu for a request for calling through a TV.

When a user input corresponding to a request for calling through a TV is received (S220), the video calling screen image may be output through the display device 400 so that the user may perform video calling with the counterpart while watching a TV. When a user input corresponding to a request for calling through a TV is received (S220), the user performs video calling with the counterpart user while watching a TV, and thus the camera 340 included in the display device 400 may be activated to start photographing for video calling. An image captured by the camera 340 may be am image for the user within the video calling screen image. The reception of the user input corresponding to a request for calling through a TV in operation S220 may be achieved by the user touching the menu 771.

In detail, the request for calling through a TV may refer to a request made so that the mobile device 500 and the counterpart device transmit or receive calling data necessary for video calling and the video calling screen image supposed to be output through the mobile device 500 is output through the display device 400. In this configuration, detailed operations performed by at least one of the mobile device 500 or the display device 400 will be described with reference to FIGS. 12 through 14.

Alternatively, the request for calling through a TV may refer to a request made so that, after video calling between the mobile device 500 and the counterpart device is initiated, while the counterpart device and the display device 400 transmit or receive calling data necessary for video calling to or from each other, the video calling screen image is displayed on the display device 400. Detailed operations performed by at least one of the mobile device 500 or the display device 400 in the above configuration will be described with reference to FIGS. 15 and 16.

Figure 8:
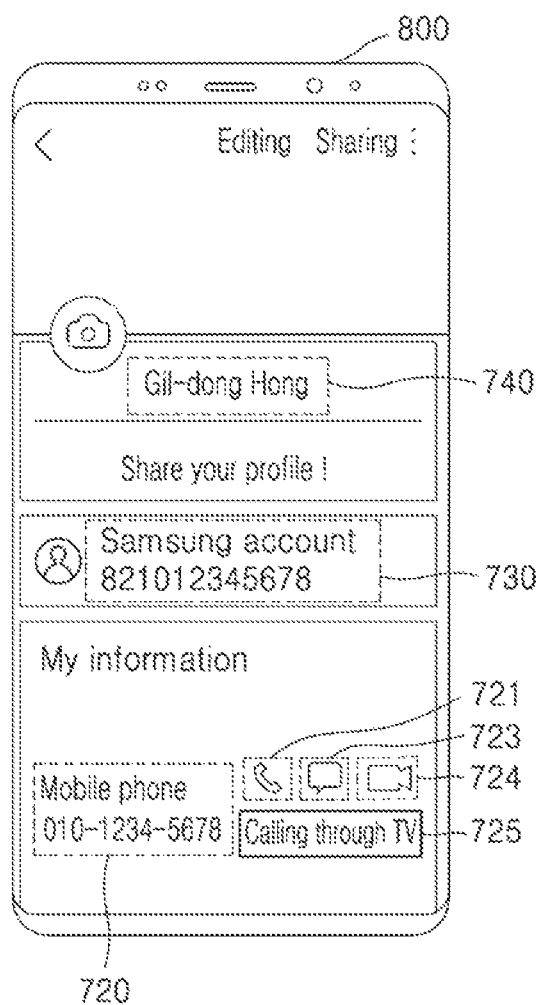
FIG. 8 illustrates a UI screen image output by a mobile device, according to an embodiment of the disclosure.

FIG. 8 illustrates a UI screen image 800 output by a mobile device according to an embodiment of the disclosure. Components of the UI screen image 800 of FIG. 8 that are the same as those of FIG. 7 are indicated by the same reference characters or symbols.

Referring to FIG. 8, the UI screen image 800 may further include a menu 725 corresponding to the request for calling through a TV, compared with the UI screen image 710. A configuration in which the menu 725 corresponds to the menu 771 of FIG. 7, but is displayed in a different form from the menu 771, is illustrated as an example.

When the UI screen image 800 includes the menu 725, the user may select (for example, via touching) the menu 725 and thus the mobile device 500 may receive a user input corresponding to the request for calling through a TV.

In response to a user input corresponding to a request for calling through a TV being received (S220), the processor 505 of the mobile device 500 transmits the video calling request to the display device 400 (S230). Operation S230 may be performed by the communication interface 530 under the control of the processor 505 of the mobile device 500. In other words, the communication interface 530 transmits the video calling request under the control of the processor 505.

Then, in the video calling method 600, the mobile device 500 displays a control UI screen image (S250). In detail, the mobile device 500 may control a control UI screen image, which is a UI screen image for controlling execution of video calling, to be displayed through the display 520 (S250). Operation S250 may be performed by the display 520 outputting a control UI screen image under the control of the processor 505. The control UI screen image will now be described in detail with reference to FIG. 9.

Figure 9:
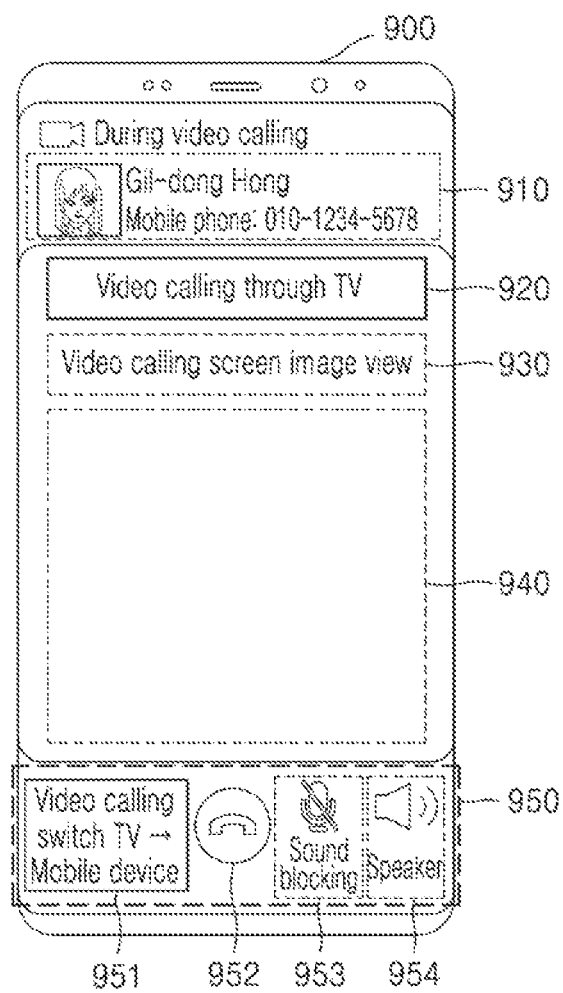
FIG. 9 illustrates a UI screen image output by a mobile device, according to an embodiment of the disclosure.

FIG. 9 illustrates a UI screen image output by a mobile device according to an embodiment of the disclosure.

Referring to FIG. 9, the mobile device 500 may output a control UI screen image 900 (S250). The control UI screen image 900 may include one or more menus (for example, 113) for controlling the video calling operation shown in FIG. 1.

A menu 951, a menu 952, a menu 953, and a menu 954 of FIG. 9 respectively correspond to the menu 114 for changing outputting of the video calling screen image between the mobile device 110 and the display device 120, the menu 116 for terminating video calling, the menu 117 for canceling the voice of the user (mute) during video calling, and the menu 113 for changing the voice of the user during video calling to a speaker output and/or an earphone output, which have been described above with reference to FIG. 1, and thus redundant descriptions thereof will be omitted.

The control UI screen image 900 may further include a menu for controlling at least one of initiation, execution, or termination of video calling, in addition to the menus 951, 952, 953, and 954.

The control UI screen image 900 may include a status message 920 informing that video calling is being conducted through the display device 400 connected to the mobile device 500, for example, through TV. The status message 920 may include information about a situation in which video calling is executed.

The control UI screen image 900 may further include a menu 930 requesting the video calling screen image including the image for the user and the image for the counterpart to be displayed within the control UI screen image 900. In response to a user input corresponding to the menu 930, the processor 505 may control the video calling screen image to be displayed within a partial region (for example, 940) of the control UI screen image 900.

The control UI screen image 900 may control the video calling screen image including the image for the user and the image for the counterpart to be displayed within the partial region (for example, 940) of the control UI screen image 900. In other words, even when there are no user inputs for selecting the menu 930, the control UI screen image 900 may control the video calling screen image to be displayed on the partial region (for example, 940) of the control UI screen image 900.

Figure 10:
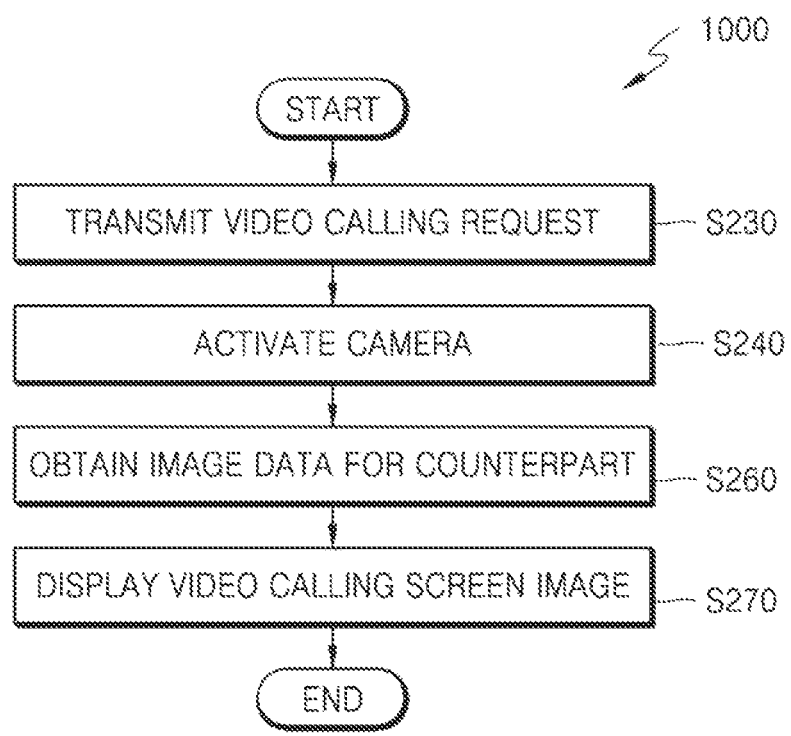
FIG. 10 is a flowchart of a video calling method performed by a display device, according to an embodiment of the disclosure.

FIG. 10 is a flowchart of a video calling method 1000 performed by a display device, according to an embodiment of the disclosure.

Referring to FIG. 10, the video calling method 1000 is performed through a display device according to an embodiment of the disclosure, for example, the display device 400. FIG. 10 may be a flowchart illustrating operations performed by the display device according to an embodiment of the disclosure, for example, the display device 400.

Referring to FIG. 10, the video calling method 1000 includes an operation, performed by the display device 400, of receiving the video calling request (S230). In detail, the communication interface 330 may receive the video calling request from the mobile device 500 under the control of the processor 310.

In response to the video calling request, the camera 340 included in the display device 400 is activated (S240). In detail, in response to the video calling request received in operation S230, the processor 310 may control the camera 340 to be activated, and accordingly, the camera 340 may initiate video capture. In detail, the processor 310 may control the camera 340 and the front side camera to be activated so that camera 340 may obtain the image for the user. In other words, in response to the video calling request, it may be determined that the user wants to execute video calling while watching the display device 400, and the processor 310 may activate the camera 340 to obtain a user image necessary for video calling, so that the user may perform video calling while watching the video calling screen image displayed on the display device 400.

In the video calling method 1000, data corresponding to the image for the user obtained by the activated camera 340 may be transmitted from the display device 400 to the mobile device 500. In this configuration, the mobile device 500 may transmit the data corresponding to the image for the user, which is received from the display device 400, to the counterpart device.

Alternatively, in the video calling method 1000, the data corresponding to the image for the user obtained by the activated camera 340 may be transmitted from the display device 400 to the server for supporting video calling.

The video calling method 1000 may further include an operation of transmitting the data corresponding to the image for the user, obtained by the display device 400, from the counterpart device to at least one of the mobile device 500 and/or the server for supporting video calling, so that the counterpart device may display the video calling screen image including a second image for the user.

Then, in the video calling method 1000, the image data for the counterpart of video calling may be obtained (S260). In detail, the display device 120 may obtain the image data for the counterpart user of video calling (S260). Operation S260 may be performed by the communication interface 330 under the control of the processor 310.

In detail, operation S260 may be performed by the display device 400 contacting the server for supporting video calling through the communication interface 330 and receiving the image data for the counterpart from the counterpart device.

Alternatively, operation S260 may be achieved by the display device 400 receiving the image data for the counterpart from the mobile device 500. In this configuration, the mobile device 500 may contact the server for supporting video calling through the communication interface 530 and receive the image data for the user from the counterpart device. The mobile device 500 may transmit the image data for the counterpart received from the server to the display device 400. Alternatively, the mobile device 500 may generate an image ('first image') of the counterpart, based on the image data for the counterpart received from the server. The mobile device 500 may generate mirroring data corresponding to the first image, and may transmit the generated mirroring data to the display device 400 so that the first image to be mirrored on the display device 400.

Then, in the video calling method 1000, the display device 400 displays the video calling screen image (S270). Operation S270 may be performed by the display 320 under the control of the processor 310.

In detail, the display device 400 may display, through the display 320, a video calling screen image (for example, 140 of FIG. 1) including the first image for the counterpart user generated based on the image data obtained in operation S260 and the second image for the user obtained by the camera of the display device 400 (S270).

Figure 11:
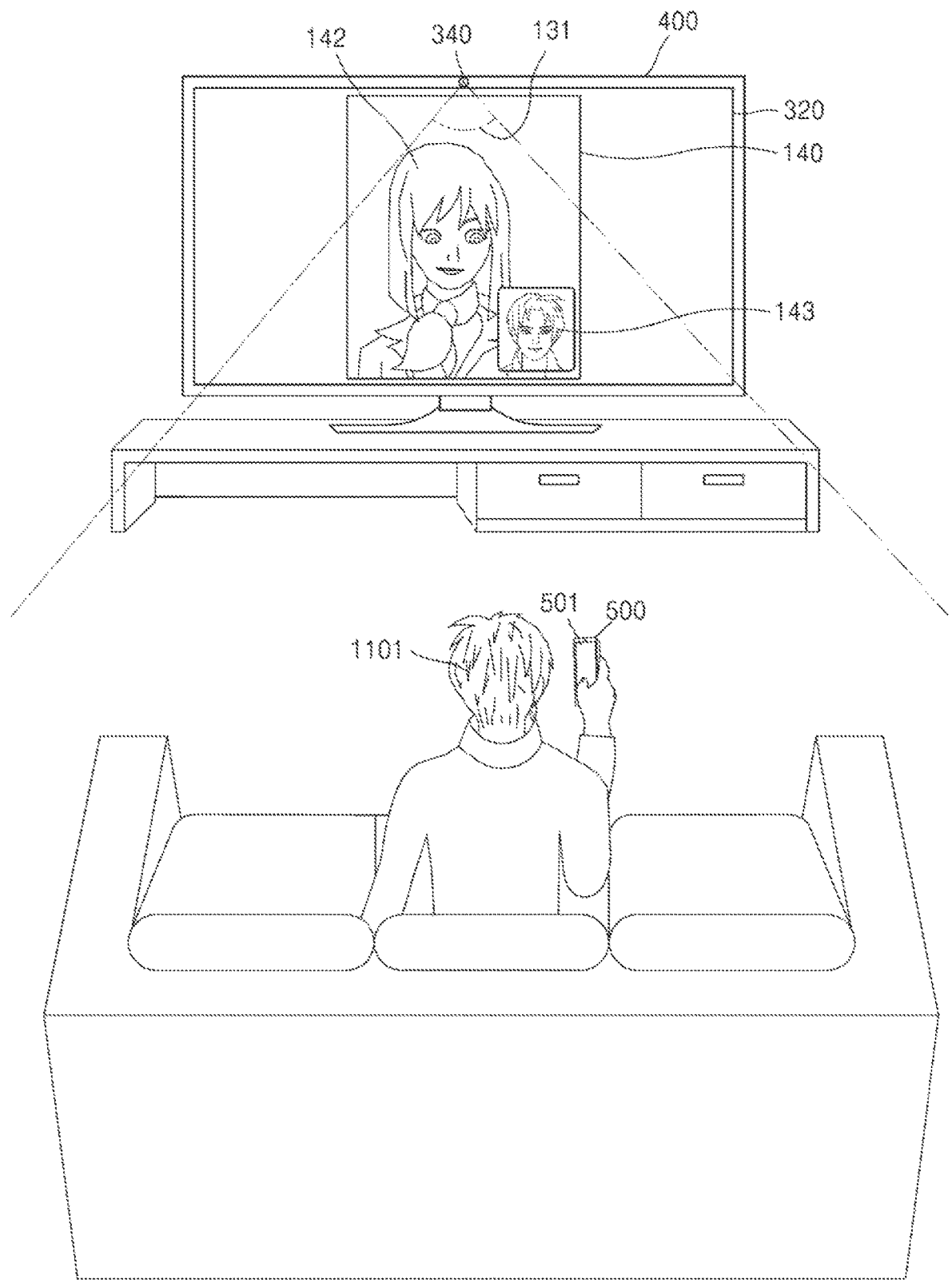
FIG. 11 illustrates a video calling screen image output by a display device, according to an embodiment of the disclosure.

FIG. 11 illustrates a video calling screen image output by a display device according to an embodiment of the disclosure. Components of FIG. 11 that are the same as the components of FIGS. 1 and 4 are indicated by the same reference numerals or characters.

Referring to FIG. 11, according to an embodiment of the disclosure, a user 1101 may perform video calling while watching the display 320 of the display device 500 connected to the mobile device 500. In detail, the display 320 of the display device 500 may perform video calling while watching the video calling screen image 140 including the first image 142, which is an image for the counterpart, and the second image 143, which is an image for the user 1101. The camera 340 of the display device 400 may obtain an image for the user necessary for generating the video calling screen image, by photographing a front side 131 of the display device 400.

According to an embodiment of the disclosure, the user 1101 may more realistically perform video calling by performing video calling while watching the screen of the display device 400 providing a large screen compared with the mobile device 500. Because the user does not need to move his or her arm to lift the mobile device 500 so that the mobile device 500 may photograph the user's face, the user may more conveniently perform video calling.

Figure 12:
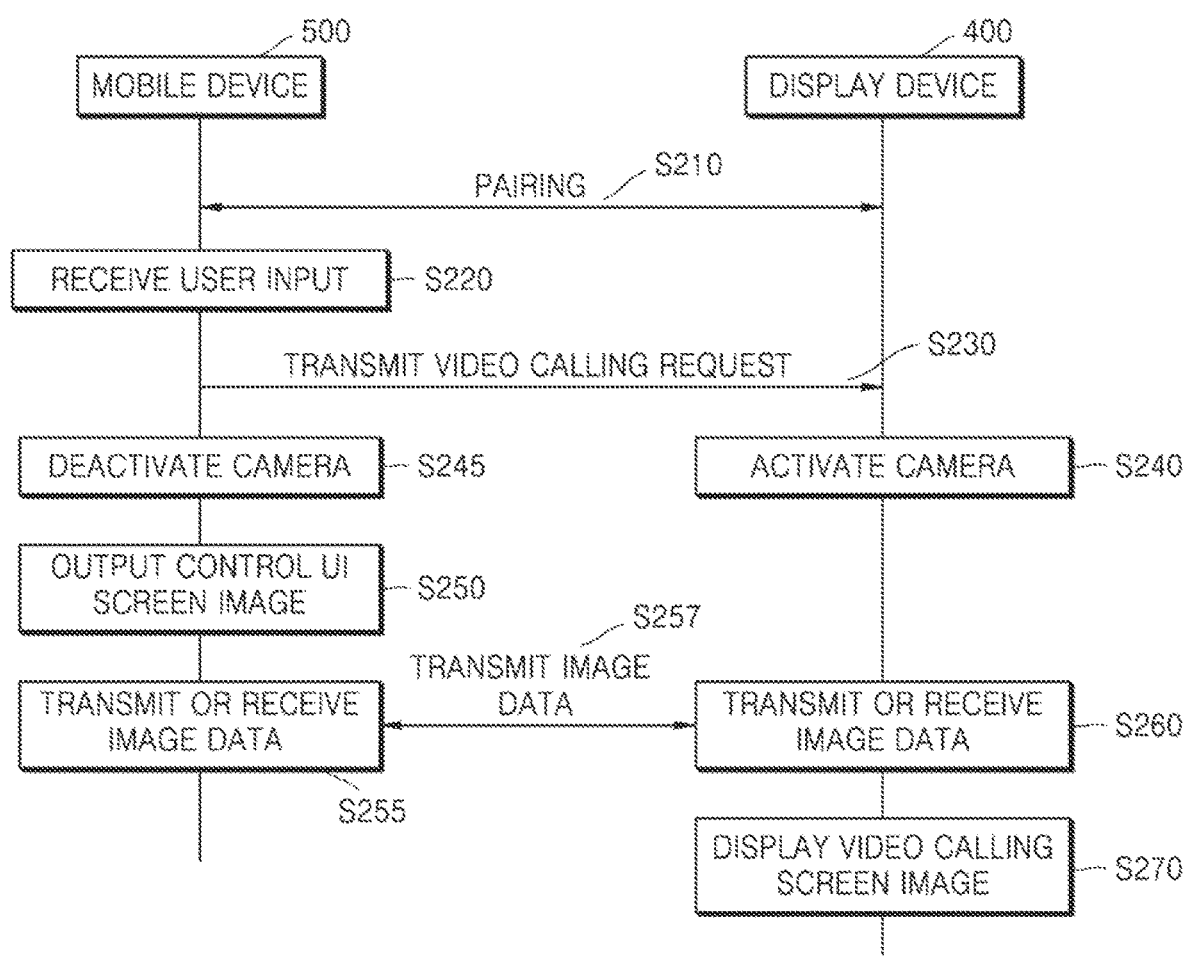
FIG. 12 is a flowchart of an image calling method according to an embodiment of the disclosure.

FIG. 12 is a flowchart of an image calling method according to an embodiment of the disclosure.

FIG. 12 is a flowchart for explaining operations performed by a mobile device (for example, 110 or 500) or a display device (for example, 120, 300, or 400) according to an embodiment of the disclosure. Components of FIG. 12 that are the same as the components of FIGS. 1 through 11 are indicated by the same reference numerals or characters. Thus, a redundant description thereof is omitted in the description of the video calling method illustrated in FIG. 12.

The mobile device 500 of FIG. 5 is an example of the mobile device that performs the operations of FIG. 12. The display device 400 of FIG. 4 is an example of the display device that performs the operations of FIG. 12.

Referring to FIG. 12, the mobile device 500 may further perform at least one of operations S245, S255, and S257, as compared with the mobile device 110 described above with reference to FIG. 2.

Referring to FIG. 12, the mobile device 500 may deactivate the camera 540, based on the user input received in operation S220 (S245). In detail, the processor 505 of the mobile device 500 may control the camera 540 to be in an deactivated state in which image capturing is not performed, in response to reception of the user input in operation S220. The user input received in operation S220 may be a request made for the display device 400 to output the video calling screen image and obtain the image for the user, in detail, for the camera 340 of the display device 400 to obtain the image for the user by photographing the user. Accordingly, when the display device 400 performs outputting of the video calling screen image and photographing of the user in correspondence with the user input received in operation S220, the mobile device 500 does not need to perform photographing of the user necessary for video calling. Therefore, the mobile device 500 may control the camera 540 to be in an inactivation state to prevent the camera 540 from unnecessarily operating, thereby reducing unnecessary power consumption to activate the camera 540.

The user input received in operation S220 is an input for requesting the video calling screen image to be output through the display device 400. In detail, the user input may be an input for requesting the video calling screen image to be output through the display device 400 while video calling is being performed by the mobile device 500. Because outputting of the video calling screen image may accompany an image capture operation with respect to the user, the display device 400 may perform capture of the image for the user through the camera 340 and displaying of the video calling screen image through the display 320.

In detail, based on the user input received in operation S220, the mobile device 500 may receive the image data for the counterpart (S255). Operation S255 may be performed by the communication interface 530 under the control of the processor 505.

In detail, based on the user input received in operation S220, the mobile device 500 may transmit or receive data for video calling to or from the counterpart device by connecting to the server for supporting video calling (S255). In detail, the mobile device 500 may receive, from the display device 400, the image data corresponding to the image for the user obtained by the camera activated in operation S240 (S257). In this configuration, operation S255 may further include an operation of transmitting image data corresponding to the received image for the user to the server for supporting video calling. In other words, operation S255 may include image data transmission or reception between the mobile device 500 and the server for supporting video calling.

The mobile device 500 may transmit, to the display device 400, image data corresponding to the image for the counterpart received from the server for supporting video calling in operation S257. Operation S257 may be performed by the communication interface 530 under the control of the processor 505. Operation S257 may further include an operation of transmitting image data corresponding to the image for the user obtained by the camera 340 of the display device 400 to the mobile device 500. In other words, operation S257 may refer to image data transmission or reception between the mobile device 500 and the display device 400.

Accordingly, the display device 400 may obtain the image data corresponding to the image for the counterpart (S260), by receiving the image data corresponding to the image for the counterpart from the mobile device 500 (S257). Operation S260 may be performed by the communication interface 330 under the control of the processor 310.

According to an embodiment of the disclosure, the mobile device 500 may transmit the image data corresponding to the image for the counterpart received from the server for supporting video calling, to the display device 400, without changes.

According to an embodiment of the disclosure, the processor 505 of the mobile device 500 may transmit mirroring data including the image for the counterpart to the display device 400 so that the image for the counterpart generated by the mobile device 500 may be mirrored and displayed by the display device 400.

Alternatively, the image data for the counterpart transmitted by the mobile device 500 to the display device 400 in operation S257 may be mirroring data. In detail, the processor 505 of the mobile device 500 may generate an image for the counterpart for use in video calling, based on the image data for the counterpart received from the server for supporting video calling. The processor 505 may generate mirroring data for mirroring the image for the counterpart, so that the generated image for the counterpart is mirrored and output by the display device 400. The generated mirroring data may be transmitted to the display device 400. Accordingly, the processor 310 of the display device 400 may mirror the image for the counterpart generated by the mobile device 500 to control the image data bout the counterpart to be received from the mobile device 500.

Figure 13:
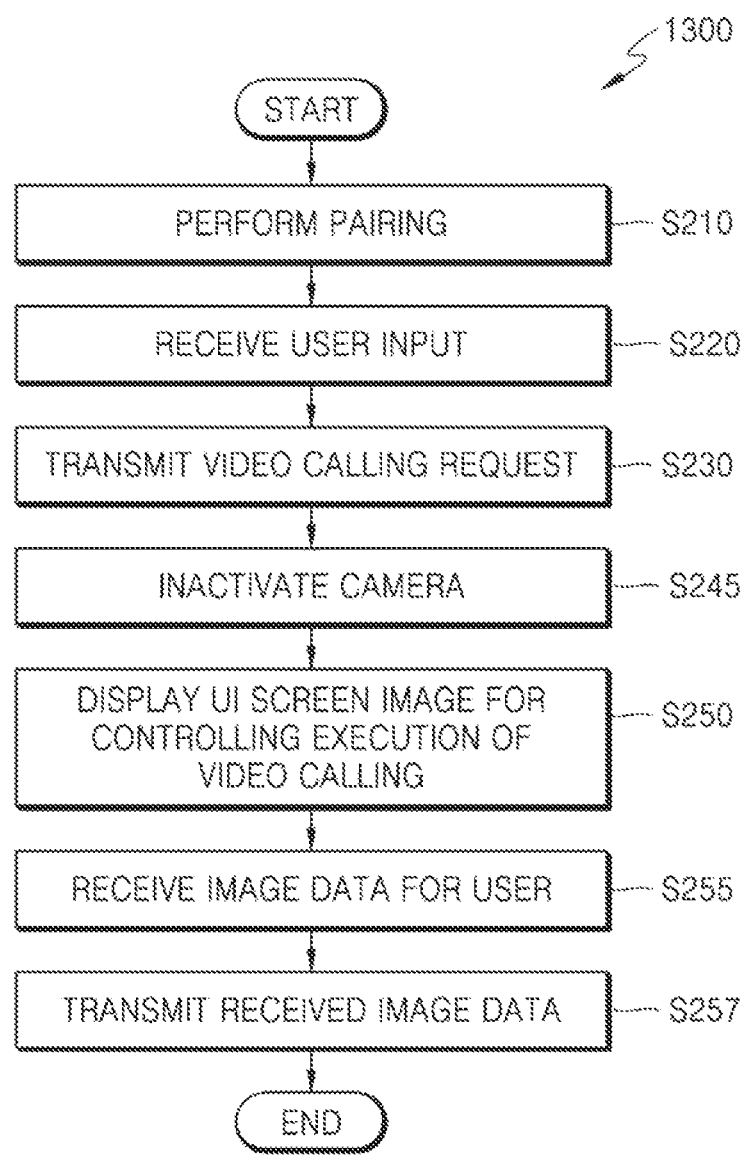
FIG. 13 is a flowchart of a video calling method performed by a mobile device, according to an embodiment of the disclosure.

FIG. 13 is a flowchart of a video calling method 1300 performed by a mobile device according to an embodiment of the disclosure. The operations of FIG. 13 may be performed by a mobile device according to an embodiment of the disclosure (for example, 110 or 500). Components of FIG. 13 that are the same as the components of FIGS. 6 and 12 are indicated by the same reference numerals or characters. Thus, a redundant description thereof will be omitted in the description of the components of FIG. 13.

Referring to FIG. 13, the video calling method 1300 may be performed by the mobile device (for example, 110 or 500). A configuration in which the video calling method 1300 is performed by the mobile device 500 will now be described. The video calling method 1300 is described by referring to the display device 400 of FIG. 4 illustrated as a display device connected to the mobile device 500.

Referring to FIG. 13, the video calling method 1300 may further include at least one of operations S210, S245, S255 and S257, as compared with the video calling method 600 of FIG. 6.

In detail, in the video calling method 1300, pairing between the mobile device 500 and the display device 400 may be performed (S210). Although pairing operation S210 is performed before operation S220 in FIG. 13, pairing operation S210 may be performed in response to a user input of requesting for video calling, or may be performed simultaneously with or before or after operation S220.

In the video calling method 1300, the camera 540 may be inactive based on the user input received in operation S220 (S245). Although operation S245 is performed subsequent to operation S230 in FIG. 13, operation S245 may only be performed simultaneously with or after operation S220.

In the video calling method 1300, the image data for the user may be received from the display device 400 (S255), and may be transmitted to the server for supporting video calling (S257).

Figure 14:
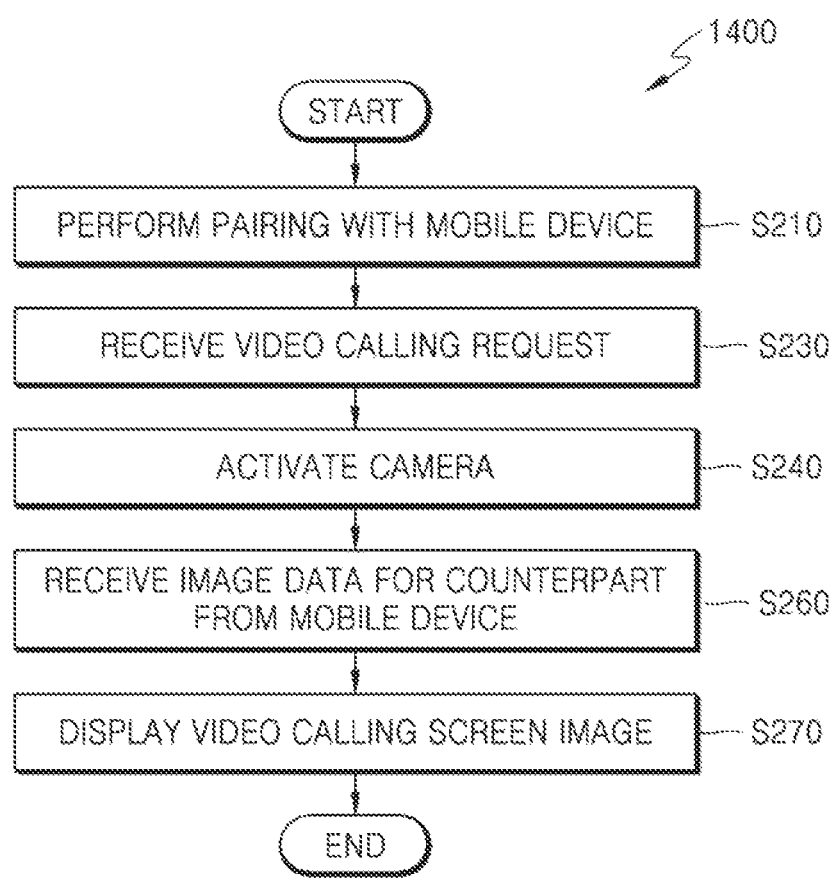
FIG. 14 is a flowchart of a video calling method performed by a display device, according to an embodiment of the disclosure.

FIG. 14 is a flowchart of a video calling method 1400 performed by a display device according to an embodiment of the disclosure. The operations of FIG. 14 may be performed by a display device according to an embodiment of the disclosure (for example, 120, 300 or 400). Components of FIG. 14 that are the same as the components of FIGS. 10 and 12 are indicated by the same reference numerals or characters. Thus, a redundant description thereof will be omitted in the description of the components of FIG. 14.

Referring to FIG. 14, the video calling method 1400 may be performed by the display device (for example, 120, 300, or 400). A configuration in which the video calling method 1400 is performed by the display device 400 of FIG. 4 will now be described. The video calling method 1400 is described by referring to the mobile device 500 of FIG. 5 illustrated as a mobile device connected to the display device 400.

Referring to FIG. 14, operation S260 of the video calling method 1400 may include receiving the image data for the counterpart from the mobile device 500. In detail, the display device 400 may obtain the image data for the counterpart by receiving the image data for the counterpart from the mobile device 500 and display the video calling screen image in operation S270.

Figure 15:
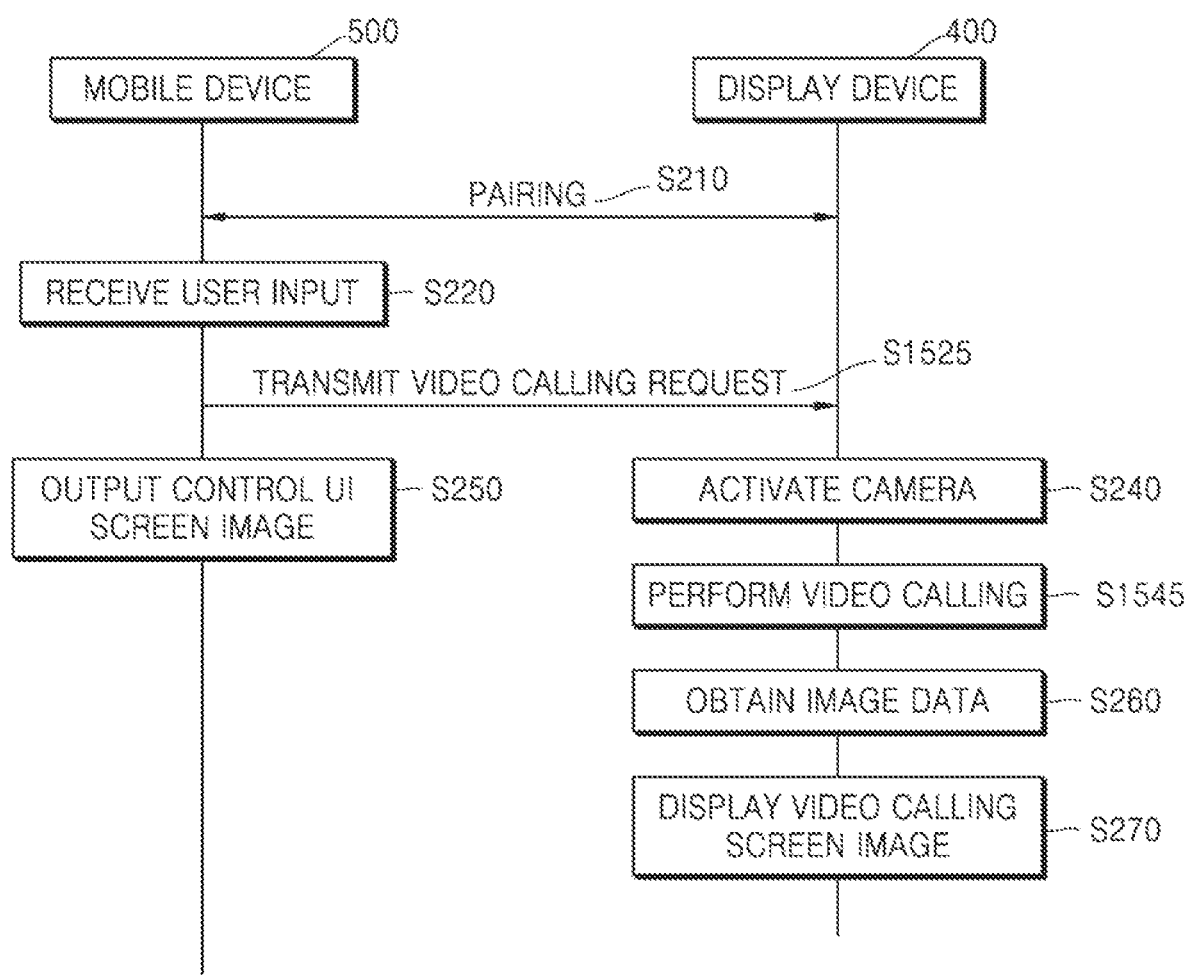
FIG. 15 is a flowchart of an image calling method according to an embodiment of the disclosure.

FIG. 15 is a flowchart of an image calling method according to an embodiment of the disclosure. FIG. 15 is a flowchart for explaining operations performed by a mobile device (for example, 110 or 500) or a display device (for example, 120, 300, or 400) according to an embodiment of the disclosure. Components of FIG. 15 that are the same as the components of FIGS. 1 through 14 are indicated by the same reference numerals or characters. Thus, a redundant description thereof is omitted in the description of the components illustrated in FIG. 15.

The mobile device 500 of FIG. 5 is an example of the mobile device that performs the operations of FIG. 15. The display device 400 of FIG. 4 is an example of the display device that performs the operations of FIG. 15.

Referring to FIG. 15, the display device 400 may further perform operation S1545, as compared with the display device 120 of FIG. 2.

Operation S1525 of FIG. 15 may correspond to operation S230 of FIG. 2.

According to an embodiment of the disclosure, the mobile device 500 may transmit to the display device 400 a video calling request including connection information for the counterpart device corresponding to the counterpart.

Referring to FIG. 15, the mobile device 500 may transmit to the display device 400 a video calling request including connection information for the counterpart device corresponding to the counterpart of video calling. Accordingly, the display device 400 may receive the video calling request including the connection information for the counterpart device. Operation S1525 may be performed by the communication interface 530 transmitting the video calling request including the connection information for the counterpart device under the control of the processor 505 of the mobile device 500. Operation S1525 may be performed by the communication interface 330 receiving the video calling request including the connection information for the counterpart device under the control of the processor 310 of the display device 400.

The connection information for the counterpart device may be communication connection information for connection with the counterpart device to call with the counterpart. For example, the connection information may be a mobile phone number (for example, 720 of FIG. 7) of the counterpart device.

The video calling request received in operation S1525 may be a request made for video calling initiated through the mobile device 500 to be performed through the display device 120. In detail, when video calling initiated through the mobile device 500 is performed by the display device 120, the display device 120 may transmit or receive the image data necessary for video calling not via the mobile device 500 by connecting to the server for supporting video calling.

The display device 400 may perform video calling with the counterpart device through the server for supporting video calling, based on the connection information received in operation S1525 (S1545). Operation S1545 may be performed under the control of the processor 310. In detail, the processor 310 may control the communication interface 330 to receive the image data for the counterpart from the counterpart device (in detail, from the counterpart device through the server for supporting video calling), based on the connection information received in operation S1525.

Accordingly, the display device 400 may obtain the image data for the counterpart user necessary for video calling by directly receiving the image data for the counterpart user from the server for supporting video calling (S260).

Figure 16:
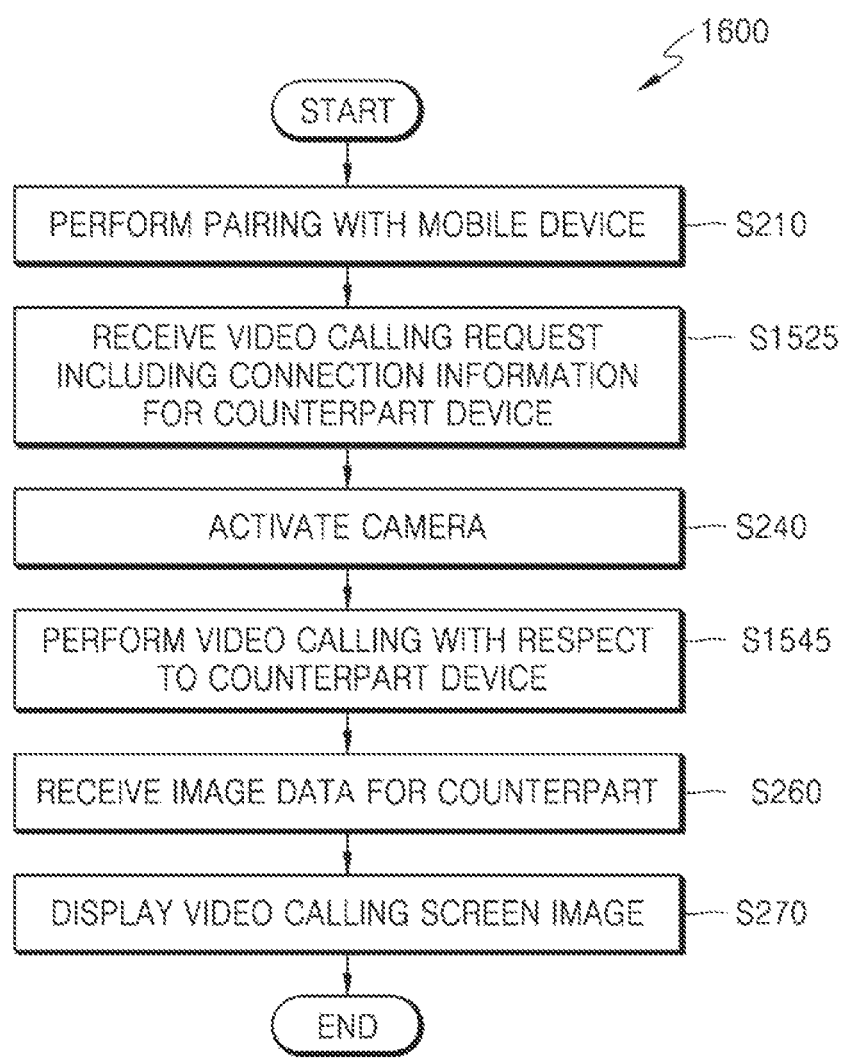
FIG. 16 is a flowchart of a video calling method performed by a display device, according to an embodiment of the disclosure.

FIG. 16 is a flowchart of a video calling method 1600 performed by a display device according to an embodiment of the disclosure. The operations of FIG. 16 may be performed by a display device according to an embodiment of the disclosure (for example, 120, 300 or 400). Components of FIG. 16 that are the same as the components of FIGS. 10 and 15 are indicated by the same reference numerals or characters. Thus, a redundant description thereof will be omitted in the description of the components of FIG. 16.

Referring to FIG. 16, the video calling method 1600 may be performed by the display device (for example, 120, 300, or 400). A configuration in which the video calling method 1600 is performed by the display device 400 of FIG. 4 will now be described. The video calling method 1600 is described by referring to the mobile device 500 of FIG. 5 illustrated as a mobile device connected to the display device 400.

Referring to FIG. 16, the display device 400 may further include operation S1545, as compared with the operations of the display device 400 of FIG. 10. Operation S1525 of FIG. 16 may correspond to operation S230 of FIG. 2.

The display device 400 may receive the video calling request including the connection information for the counterpart device (S1525).

Then, the display device 400 may perform video calling with the counterpart device through the server for supporting video calling, based on the connection information received in operation S1525 (S1545). In detail, the processor 310 may control the communication interface 330 to receive the image data for the counterpart from the counterpart device (in detail, from the counterpart device through the server for supporting video calling), based on the connection information received in operation S1525.

Although operation S1545 is performed after operation S240 in FIG. 16, operation S1545 is performed based on the video calling request received in operation S1525. Accordingly, operation S1545 may only be performed after operation S1525.

When the video calling method 1600 includes operation S1545, the display device 400 may obtain the image data for the counterpart necessary for video calling, by directly receiving the image data for the counterpart from the server for supporting video calling (S260).

Figure 17:
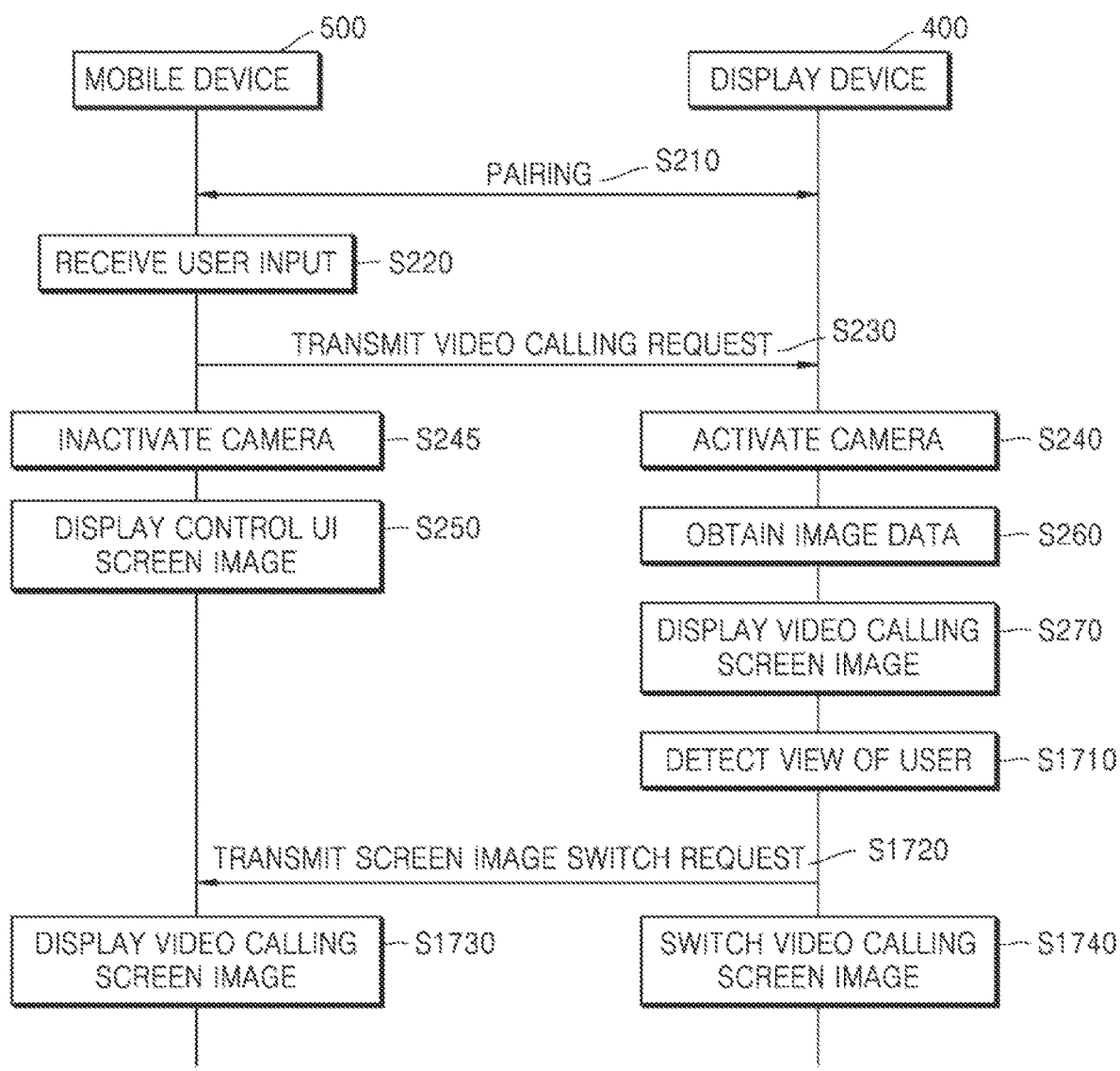
FIG. 17 is a flowchart of an image calling method according to an embodiment of the disclosure.

FIG. 17 is a flowchart of an image calling method according to an embodiment of the disclosure. FIG. 17 is a flowchart for explaining operations performed by a mobile device (for example, 110 or 500) or a display device (for example, 120, 300, or 400) according to an embodiment of the disclosure. Components of FIG. 17 that are the same as the components of FIGS. 1 through 16 are indicated by the same reference numerals or characters. Thus, a redundant description thereof is omitted in the description of the video calling method illustrated in FIG. 17.

The mobile device 500 of FIG. 5 is an example of the mobile device that performs the operations of FIG. 17. The display device 400 of FIG. 4 is an example of the display device that performs the operations of FIG. 12.

Referring to FIG. 17, the display device 400 may further perform operation S1710, S1720, and S1740, as compared with the display device 120 of FIG. 2.

According to an embodiment of the disclosure, the processor 310 of the display device 400 may detect the view of the user (S1710). In detail, the processor 310 of the display device 400 may detect the view of the user, based on the image for the user (S1710). When the view of the user detected in operation S1710 is changed from the display device 400 to the mobile device 500, the processor 310 of the display device 400 may control a screen image of at least one of the display device 400 or the mobile device 500 in correspondence with the change in the view.

In operation S1710, the view of the user may be detected by analyzing the image for the user obtained via video calling. In detail, the processor 310 may determine whether the view of the user has been changed from the display device 400 to the mobile device 500, by identifying whether there is a change in at least one of the eyeball of the user, the face of the user, the entire posture of the user, or movement (or rotation) of the head of the user by analyzing the image for the user. In detail, view detecting through image analysis may use a gaze detection technique, an eye tracking technique, a head pose estimation technique, or the like.

In operation S1710, the view of the user may be detected using a special sensor, for example, an NIR sensor, a Time of Flight (ToF) sensor, or a structured light (SL) sensor. In this configuration, the display device 400 may further include a sensor for detecting the view of the user.

In operation S1710, the view of the user may be detected based on the voice of the user.

According to an embodiment of the disclosure, the display device 400 may further include a sensor for detecting the voice of the user. The sensor for detecting a voice may be the audio input interface 467 of FIG. 4. The processor 310 may determine whether the view of the user has been changed from the display device 400 to the mobile device 500, based on a result of detecting the voice of the user. When the view of the user is changed, the processor 310 may terminate outputting of the video calling screen image and may control video calling to be performed by the mobile device 500. In detail, the processor 310 may control video calling to be performed by the mobile device 500, by transmitting, to the mobile device 500, a control signal for requesting video calling to be performed by the mobile device 500.

In detail, the audio input/output interface 465 included in the display device 400 may detect the voice of the user, and may identify whether the voice of the user is directed toward the display device 400 or the mobile device 500.

Alternatively, it is identified that the view of the user exists on a device, selected from among the display device 400 and the mobile device 500, which detects larger volume of voice of the user than the other, while detecting the voice of the user.

The display device 400 may transmit, to the mobile device 500, a screen image switch request for requesting the video calling screen image to be output by the mobile device 500 in correspondence with a change in the view (S1720). The display device 400 may switch the video calling screen image displayed in operation S270 to a different type of screen image in correspondence with the change in the view (S1740). In detail, the display device 400 may change a screen image output via the display 320 from the video calling screen image to a screen image output before video calling starts. For example, the display device 400 may display a screen image corresponding to content reproduced before the video calling screen image is output. For example, the display device 400 may receive the video calling request of operation S220 while reproducing content broadcast through channel 1. Then, when in operation S1710 that the view of the user has been changed, the display device 400 may terminate outputting of the video calling screen image and may perform screen image switch so that the content broadcast through channel 1 is reproduced.

In detail, when the view of the user detected in operation S1710 is changed from the display device 400 to the mobile device 500, the processor 310 may terminate outputting of the video calling screen image in operation S270, and may control the video calling screen image to be output by the mobile device 500.

Based on the screen image switch request in operation S1720, the mobile device 500 may control the video calling screen image to be output through the display 520. In detail, because the view of the user is located at the mobile device 500, the mobile device 500 may obtain the image for the user by activating the camera 540 included in the mobile device 500. The mobile device 500 may generate a video calling screen image including the obtained image for the user and the image for the counterpart, and may control the display 520 to display the generated video calling screen image.

An embodiment of detecting the view of the user and a change in the view through analysis of the image for the user will now be described in detail with reference to FIGS. 19 and 20.

Figure 19:
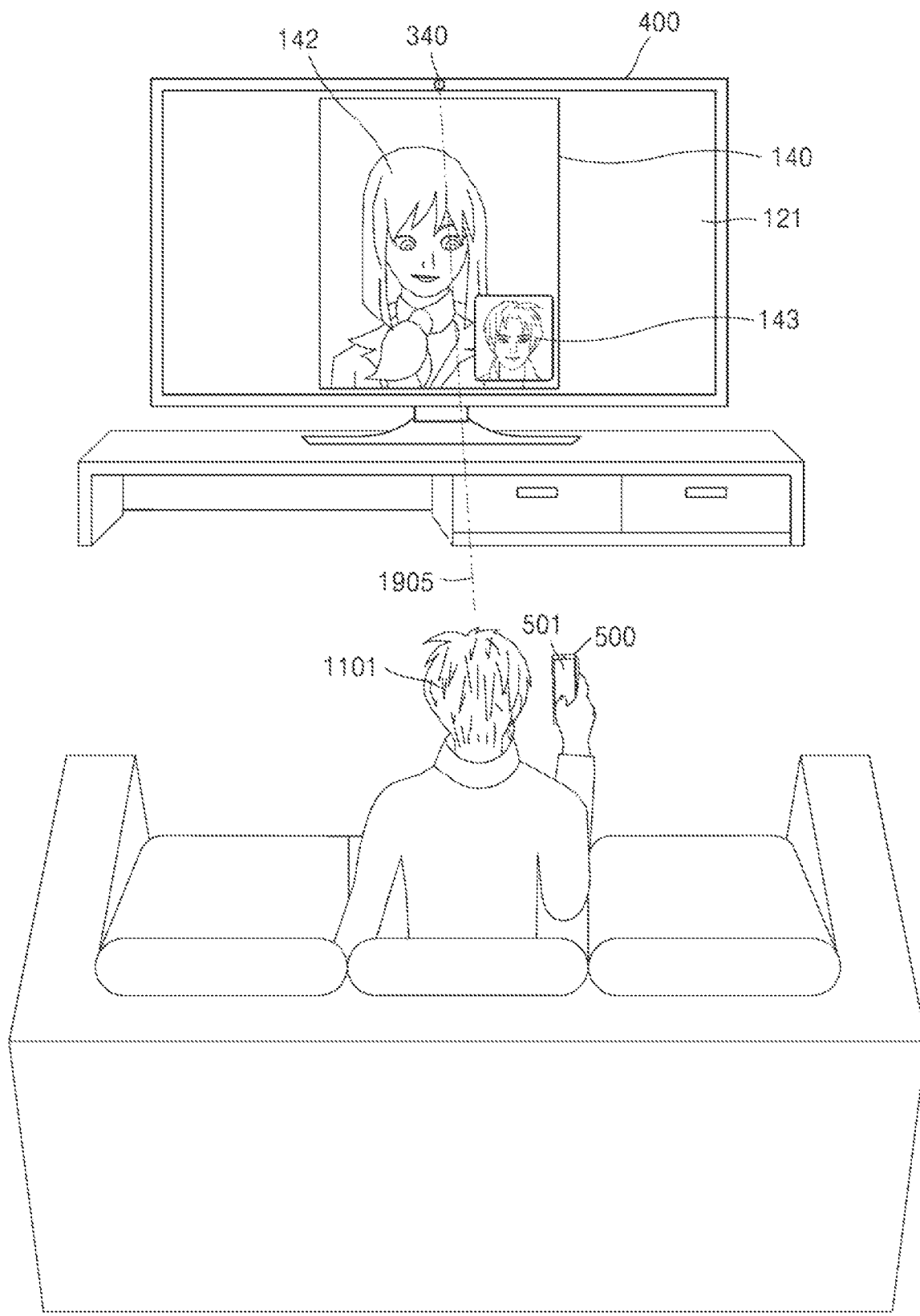
FIG. 19 is a view for explaining a view detecting operation performed by a display device, according to an embodiment of the disclosure.

FIG. 19 is a view for explaining a view detecting operation performed by a display device according to an embodiment of the disclosure. FIG. 20 is a view for explaining a view detecting operation performed by a display device according to an embodiment of the disclosure. Components of FIGS. 19 and 20 that are the same as the components of FIG. 11 are indicated by the same reference numerals or characters.

Referring to FIG. 19, the user 1101 may perform video calling with the counterpart user while watching a video calling screen image 140 output by the display device 400. While video calling is being performed, the display device 400 may detect the view of the user. For example, the display device 400 may obtain an image for a user for use in video calling by using an activated camera 340. The display device 400 may recognize whether a view 1905 of the user corresponds to the display device 400, by analyzing the obtained image for the user.

Figure 20:
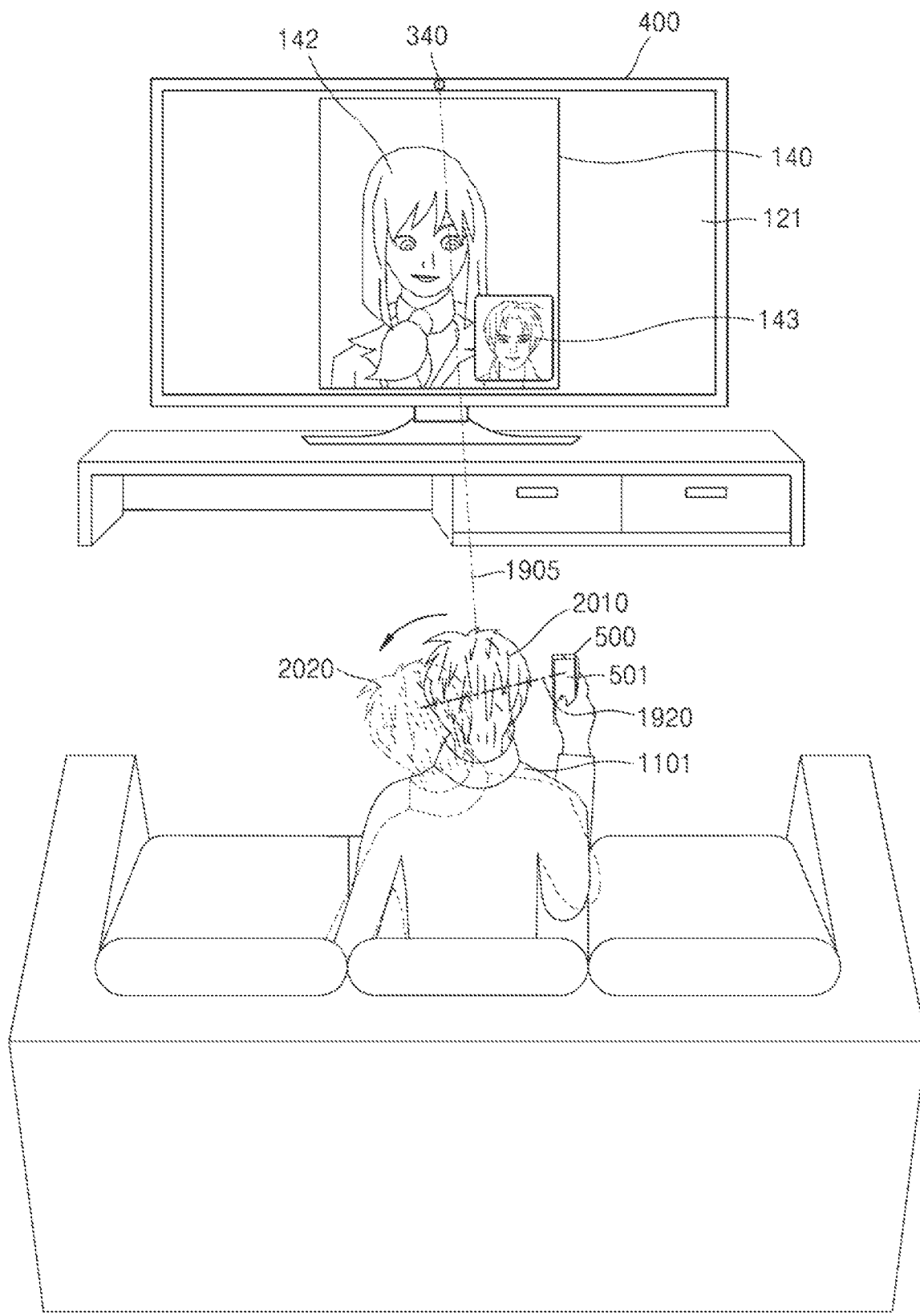
FIG. 20 is a view for explaining a view detecting operation performed by a display device, according to an embodiment of the disclosure.

Referring to FIG. 20, the user 1101 may change a posture from a posture 2010 to a posture 2020 to see a screen image 501 of the mobile device 500, while performing video calling while watching the video calling screen image 140 output by the display device 400.

In this configuration, the display device 400 may detect that the view of the user has been changed from the display device 400 to the mobile device 500, by analyzing the posture, eyeball, face, and the like of the user, based on the image for the user.

Referring to FIG. 20, the view 1905 of the display device 400 of the user 1101 may be changed to a view 1920 of the mobile device 500. Then, the display device 400 may detect this view change, and may transmit a screen image change request corresponding to the view change to the mobile device 500 (S1720). The mobile device 500 may control the display 520 to automatically output the video calling screen image received in S1720.

According to an embodiment of the disclosure, when the view of the user 1101 is changed from the display device 400 to the mobile device 500, the mobile device 500 may output the video calling screen image and perform image capture (in detail, camera photographing) with respect to the user necessary for video calling. Accordingly, a device for dynamically providing the video calling screen image in accordance with an intention of the user may be changed, and a satisfaction level and convenience of the user may be increased.

According to an embodiment of the disclosure, an operation of detecting the view of the user may be performed by a device that performs an operation of outputting a current video calling screen image and an operation of obtaining the image for the user. When the view of the user has been changed as in FIG. 19, the mobile device 500 may start image capturing with respect to the user necessary for video calling, and the video calling screen image is output through the display 520 of the mobile device 500. Accordingly, the mobile device 500 may perform an operation of detecting the view of the user by analyzing the image for the user obtained via image capturing of the user. When the mobile device 500 detects changing of the view of the user back to the display device 400, the mobile device 500 may transmit the video calling request back to the display device 400. Then, the display device 400 may perform operations (for example, S240, S260 and S270) necessary for outputting the video calling screen image, based on the video calling request.

Figure 18:
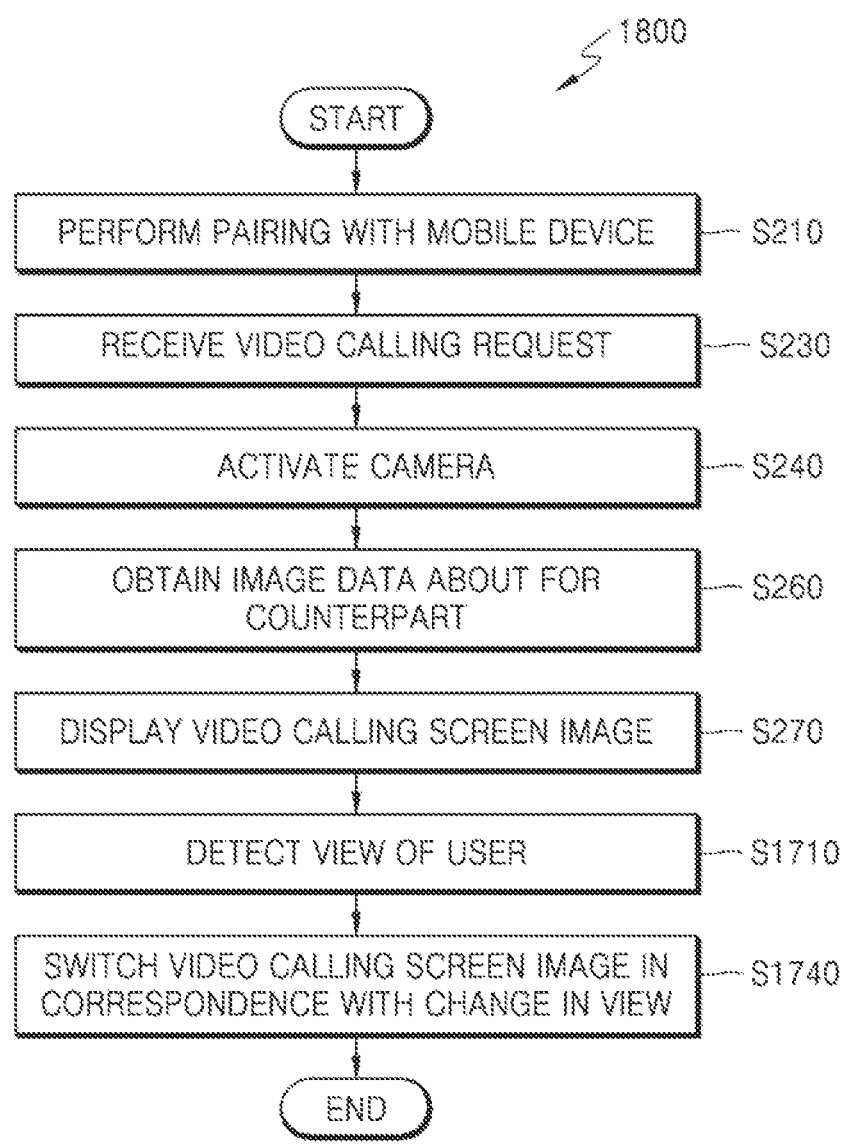
FIG. 18 is a flowchart of a video calling method performed by a display device, according to an embodiment of the disclosure.

FIG. 18 is a flowchart of a video calling method 1800 performed by a display device according to an embodiment of the disclosure. The video calling method 1800 of FIG. 18 may be a flowchart illustrating operations performed by a display device according to an embodiment of the disclosure (for example, 120, 300 or 400). Components of FIG. 18 that are the same as the components of FIG. 17 are indicated by the same reference numerals or characters. Thus, a redundant description thereof will be omitted in the description of the components of FIG. 18.

A configuration in which the video calling method 1800 is performed by the display device 400 of FIG. 4 will now be described. The video calling method 1800 is described by referring to the mobile device 500 of FIG. 5 illustrated as a mobile device connected to the display device 400.

Referring to FIG. 18, the video calling method 1800 may further include at least one of operations S210, S1710, and S1740, as compared with the video calling method 1000 of FIG. 10. Operations S1710 and S1740 of FIG. 18 have been described in detail with reference to FIGS. 17, 19 and 20, and thus redundant descriptions thereof will be omitted.

Figure 21:
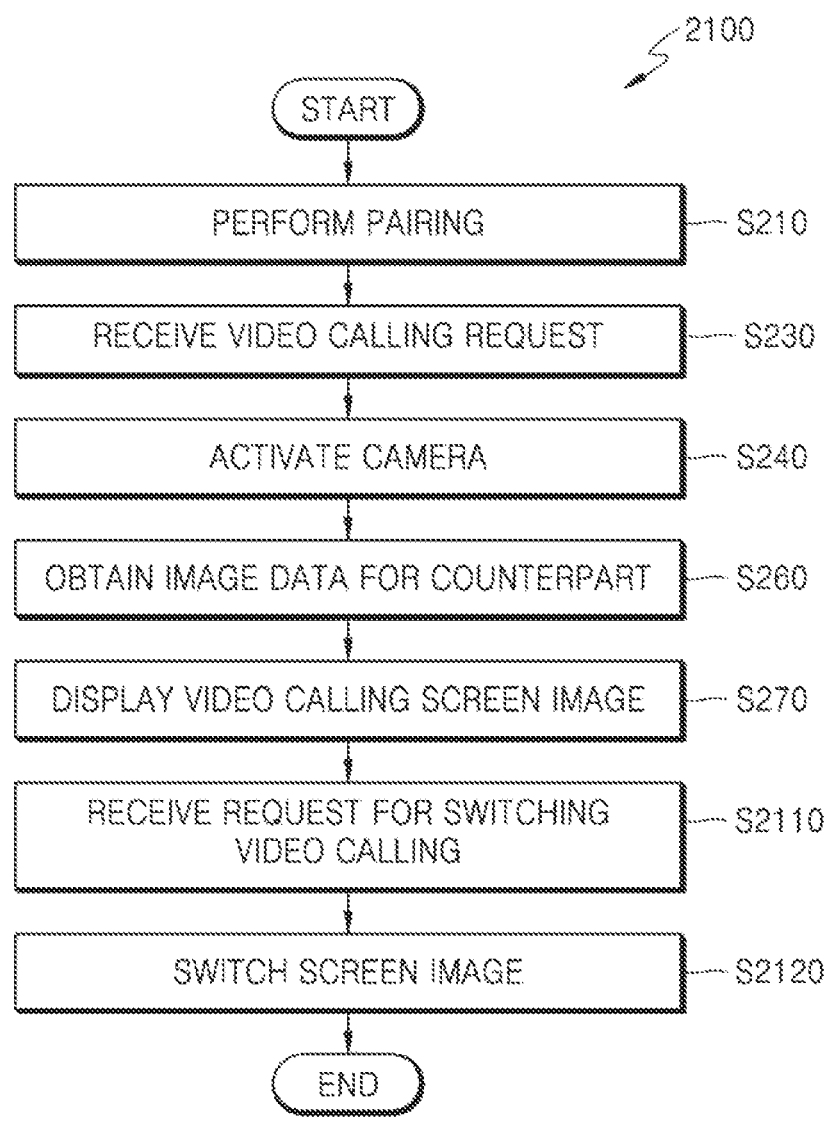
FIG. 21 is a flowchart of a video calling method performed by a display device, according to an embodiment of the disclosure.

FIG. 21 is a flowchart of a video calling method 2100 performed by a display device according to an embodiment of the disclosure. The video calling method 2100 of FIG. 21 may be a flowchart illustrating operations performed by a display device according to an embodiment of the disclosure (for example, 120, 300 or 400). Components of FIG. 21 that are the same as the components of FIG. 10 or 18 are indicated by the same reference numerals or characters. Thus, a redundant description thereof will be omitted in the description of the components of FIG. 21.

Referring to FIG. 21, the video calling method 2100 may further include at least one of operations S210, S2110, and S2120, as compared with the video calling method 1000 of FIG. 10. Operations S1710 and S1740 of FIG. 18 have been described in detail with reference to FIGS. 17, 19 and 20, and thus redundant descriptions thereof will be omitted.

After outputting the video calling screen image in operation S270, the display device 400 may receive a request for switching video calling (S2110). The request for switching video calling may include i) a request of again performing video calling through the mobile device 500, in detail, a request of performing outputting of the video calling screen image and image capture with respect to the user for video calling in the mobile device 500, ii) a request for playing back (reproducing) content, or iii) a termination request for outputting the video calling screen image.

In detail, when the user transmits a user input for selecting CH1 to the display device 400 by manipulating a remote controller for controlling the display device 400, the display device 400 may terminate outputting of the video calling screen image, based on the user input, and may control the display 320 to display a screen image corresponding to the content transmitted through CH1.

In detail, the display device 400 may receive a user input corresponding to the request for switching video calling, via the user interface 450 of the display device 400. For convenience of explanation, the user input corresponding to the request for switching video calling may be referred to as a 'first input.'

When the first input is received through the display device 400, the processor 310 may terminate outputting of a video calling screen image, based on the reception of the first input, and may control video calling to be performed by the mobile device 500.

In detail, operation S2110 may further include an operation of transmitting a control signal including the request for switching video calling to the mobile device 500. Then, in response to the control signal, the mobile device 500 enables the video calling screen image to be output through the display 520 so that video calling is achieved not through the display device 400 but through the mobile device 500.

Then, in the video calling method 2100, a screen image output by the display 320 may be switched based on the request received in operation S2110 (S2120). Operation S2120 will be described below in more detail with reference to FIG. 22.

Figure 22:
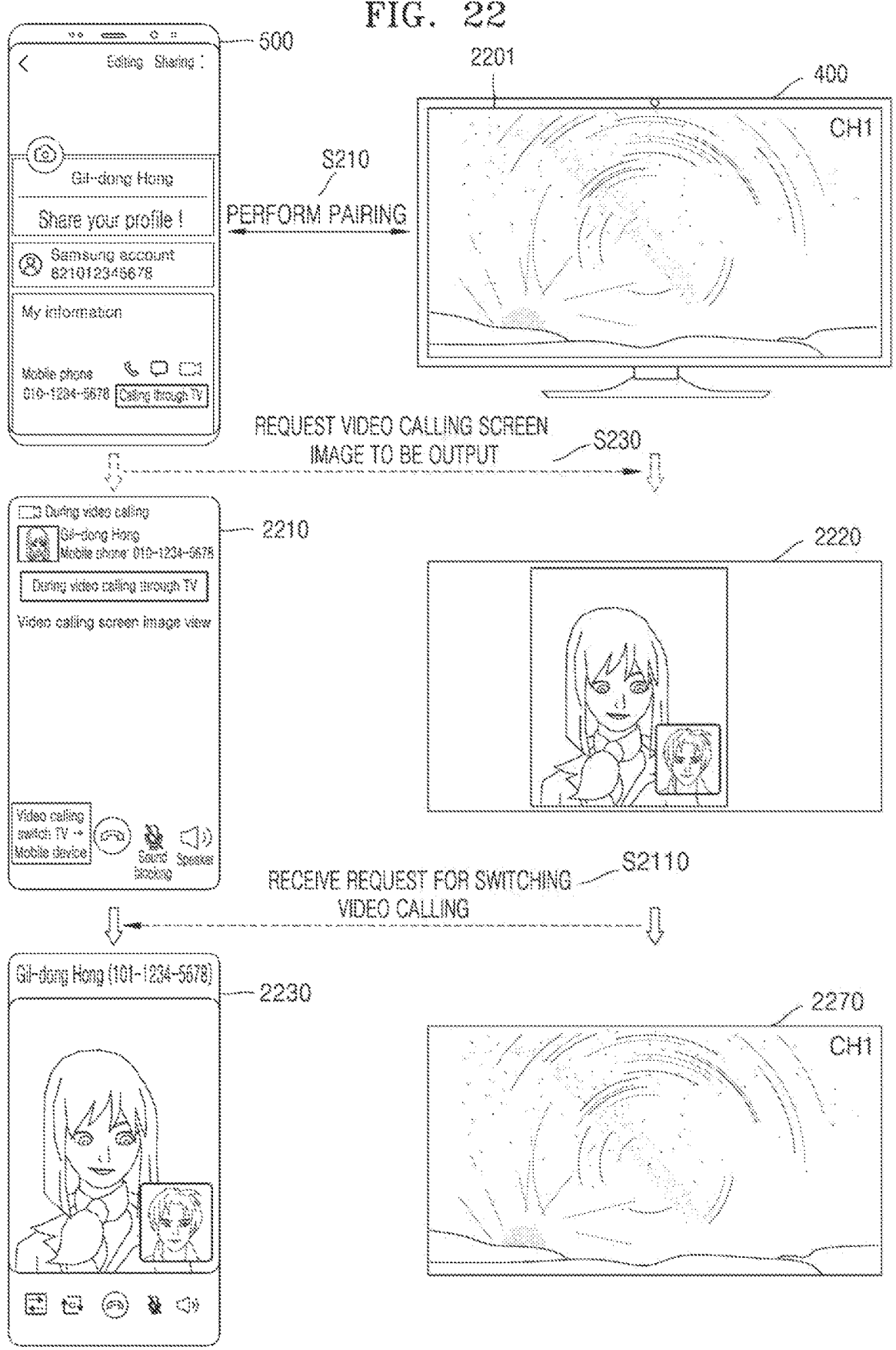
FIG. 22 is a flowchart for explaining a screen image switching operation performed by a display device, according to an embodiment of the disclosure.

FIG. 22 is a flowchart for explaining a screen image switching operation performed by a display device according to an embodiment of the disclosure.

Referring to FIG. 22, the mobile device 500 may first output the same screen image as the UI screen image 800 of FIG. 8. The display device 400 that is paired with the mobile device 500 but is a pairing target may display a playback screen image 2210 of content provided by CH1.

The user may request the video calling screen image to be output through the display device 400, by using the UI screen image (S230).

Then, the mobile device 500 may display the control UI screen image 2210 described in operation S250. The display device 400 may output a video calling screen image 2220 (S270).

Then, when a request for switching video calling is received (S2110), the display device 400 may terminate outputting of the video calling screen image 2220, and may perform a screen image switch so that the content broadcast through CH1 is displayed again. Accordingly, the display device 400 may display a screen image 2270 corresponding to the content transmitted again through CH1.

When the request for switching video calling is received (S2110), a control signal informing switch of video calling may be transmitted to the mobile device 500. Then, the mobile device 500 may output a video calling screen image 2230.

Figure 23:
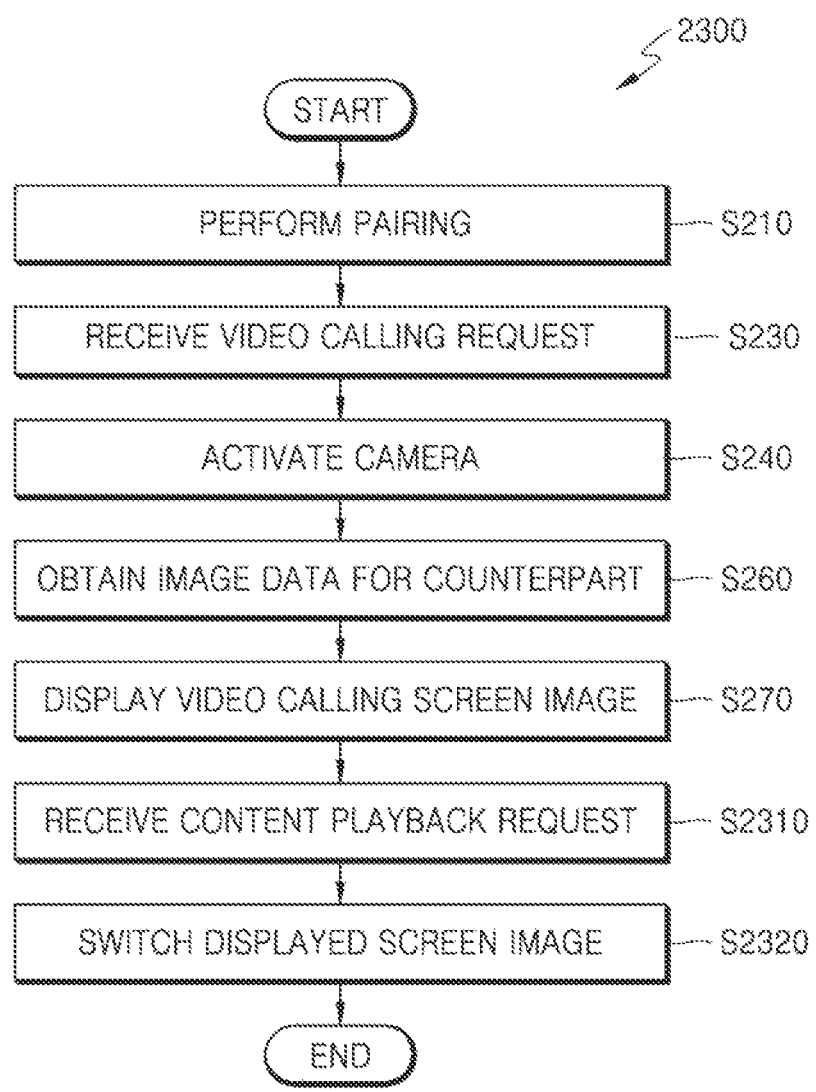
FIG. 23 is a flowchart of a video calling method performed by a display device, according to an embodiment of the disclosure.

FIG. 23 is a flowchart of a video calling method 2300 performed by a display device according to an embodiment of the disclosure. The video calling method 2300 of FIG. 23 may be a flowchart illustrating operations performed by a display device according to an embodiment of the disclosure (for example, 120, 300 or 400). Components of FIG. 23 that are the same as the components of FIG. 10 or 18 are indicated by the same reference numerals or characters. Thus, a redundant description thereof will be omitted in the description of the components of FIG. 23.

Referring to FIG. 23, the video calling method 2300 may further include at least one of operations S210, S2310, and S2320, as compared with the video calling method 1000 of FIG. 10.

In detail, after outputting the video calling screen image in operation S270, the display device 400 may receive a request for playing back content (S2310). Operation S2310 may be performed through the user interface 450. In detail, the user may manipulate a remote controller for controlling the display device 400, so that a user input of requesting playback of content desired by the user is transmitted through the user interface 450.

The display device 400 may switch a displayed screen image, based on the content playback request received in operation S2310 (S2320). Operation S2320 may be performed under the control of the processor 310.

When a user input of selecting CH1 is transmitted to the display device 400, a screen image corresponding to content transmitted through CH1 may be controlled to be displayed through the display 320. A switch in a displayed screen image based on the content playback request may be referred to as 'screen image switch.' The screen image switch will be described below in more detail with reference to FIG. 24.

Figure 24:
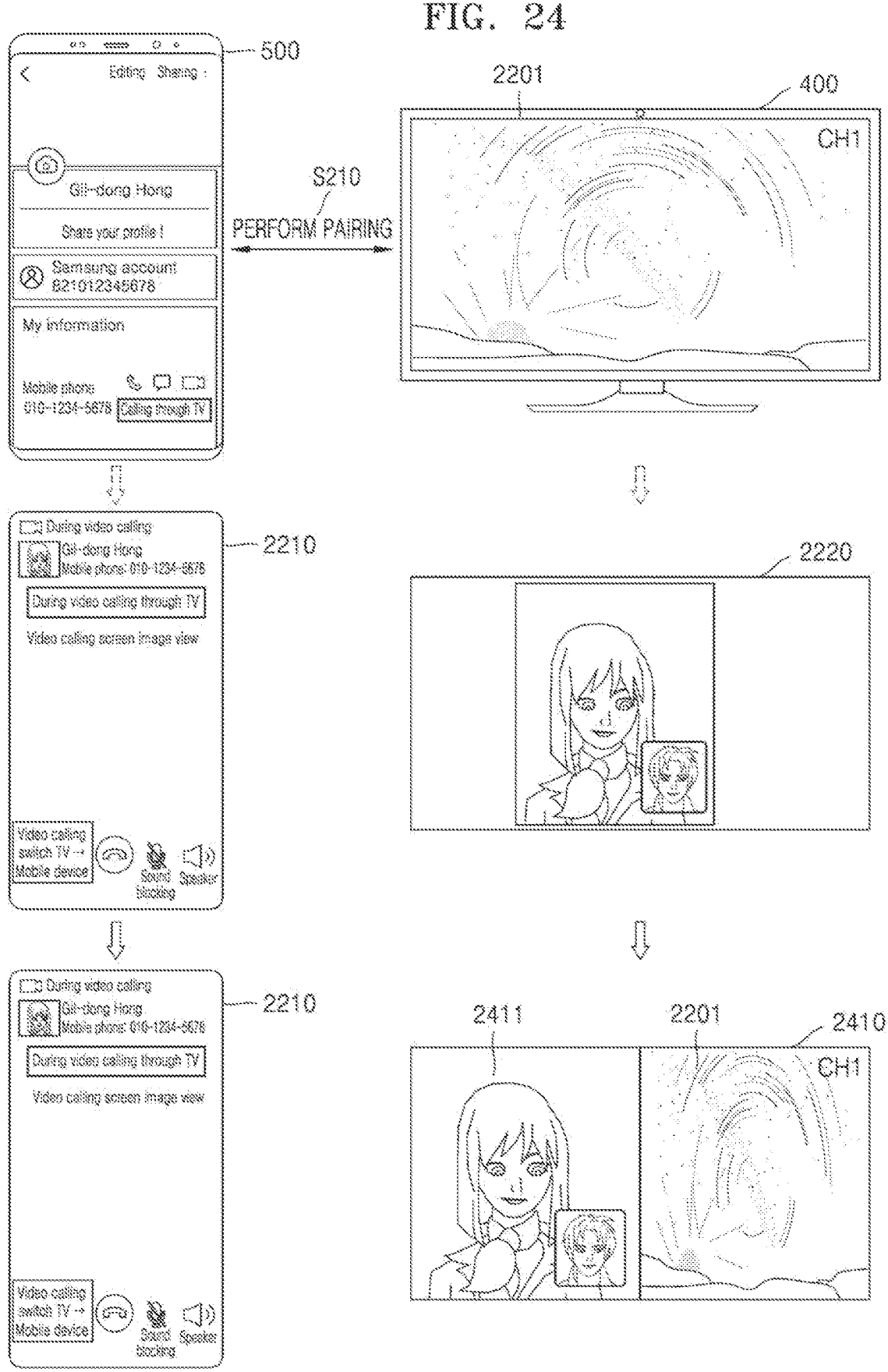
FIG. 24 is a flowchart for explaining a screen image switching operation performed by a display device, according to an embodiment of the disclosure.

FIG. 24 is a flowchart for explaining a screen image switching operation performed by a display device according to an embodiment of the disclosure. The same components of FIG. 24 as the components of FIG. 22 are indicated by the same reference numerals or characters.

Referring to FIG. 24, after the display device 400 outputs the video calling screen image 2220, the content playback request may be received (S2310). Referring to FIG. 23, the content playback request 2310 may include not only a request for playing back specific content, but also a search request for content playback (for example, an input corresponding to a channel manipulation key).

In detail, when the user manipulates a channel up key or channel down key included in the remote controller to watch content, the display device 400 may receive a content playback request corresponding to the user's manipulation or the user input.

Then, the display device 400 may control the screen 2410 including an image 2201 corresponding to playback-requested content.

In detail, the processor 310 of the display device 400 may split the displayed screen image into a first region and a second region, based on the content playback request, and may control the video calling screen image to be output through the first region and control a screen image including the content to be output through the second region.

Referring to FIG. 24, the processor 310 of the display device 400 may control the screen image 2410 including both the image 2201 corresponding to content and a video calling screen image 2411 to be displayed.

When the screen image 2410 output by the display device 400 includes both the image 2201 corresponding to content and the video calling screen image 2411, the display device 400 may selectively output audio corresponding to content and audio corresponding to video calling. For example, when the content playback request received in operation S2310 is a request corresponding to manipulation of a channel up key or channel down key for searching for content, the display device 400 may control the audio corresponding to content to be not output and the audio corresponding to video calling to be output. As another example, when the content playback request received in operation S2310 is a request corresponding to a manipulation of directly selecting specific content or a specific channel, the display device 400 may control the audio corresponding to content to be output.

Figure 25:
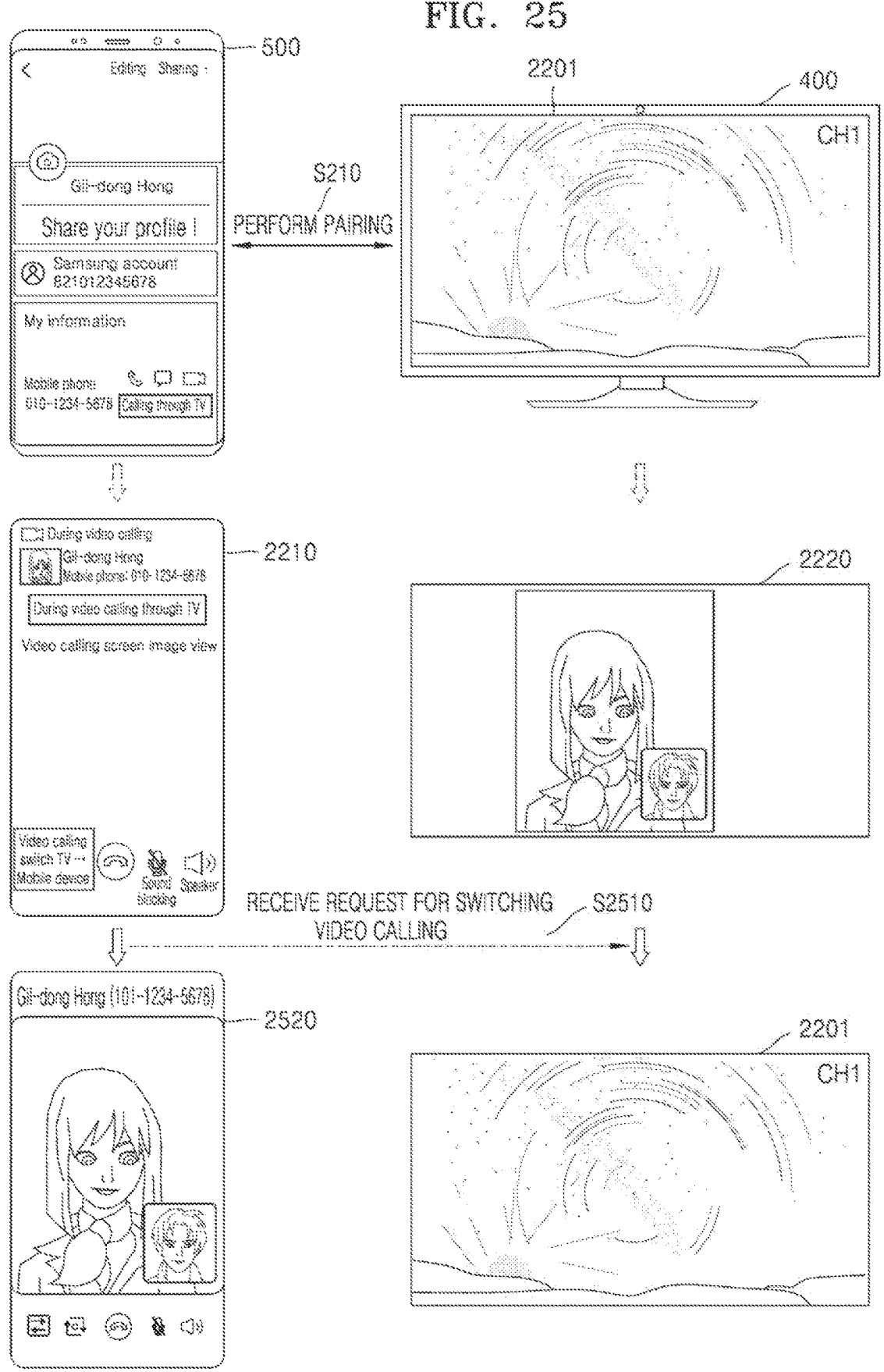
FIG. 25 is a flowchart for explaining a screen image switching operation performed by a display device, according to an embodiment of the disclosure.

FIG. 25 is a flowchart for explaining a screen image switching operation performed by a display device according to an embodiment of the disclosure.

According to an embodiment of the disclosure, a request for switching video calling may be received through the mobile device 500 (S2510). In detail, after the mobile device 500 outputs the control UI screen image 2210, the user may select a 'video calling switch TV⇆mobile' menu that is an included menu for requesting video calling switch. Then, the mobile device 500 may control the video calling screen image to be output again through the mobile device 500, and may transmit a control signal for requesting video calling switch to the display device 400.

Accordingly, the mobile device 500 may display a video calling screen image 2520 again, and the display device 400 may terminate outputting of the video calling screen image 2220. The display device 400 may control the screen image 2201 corresponding to content output before video calling is performed to be output again.

Figure 26:
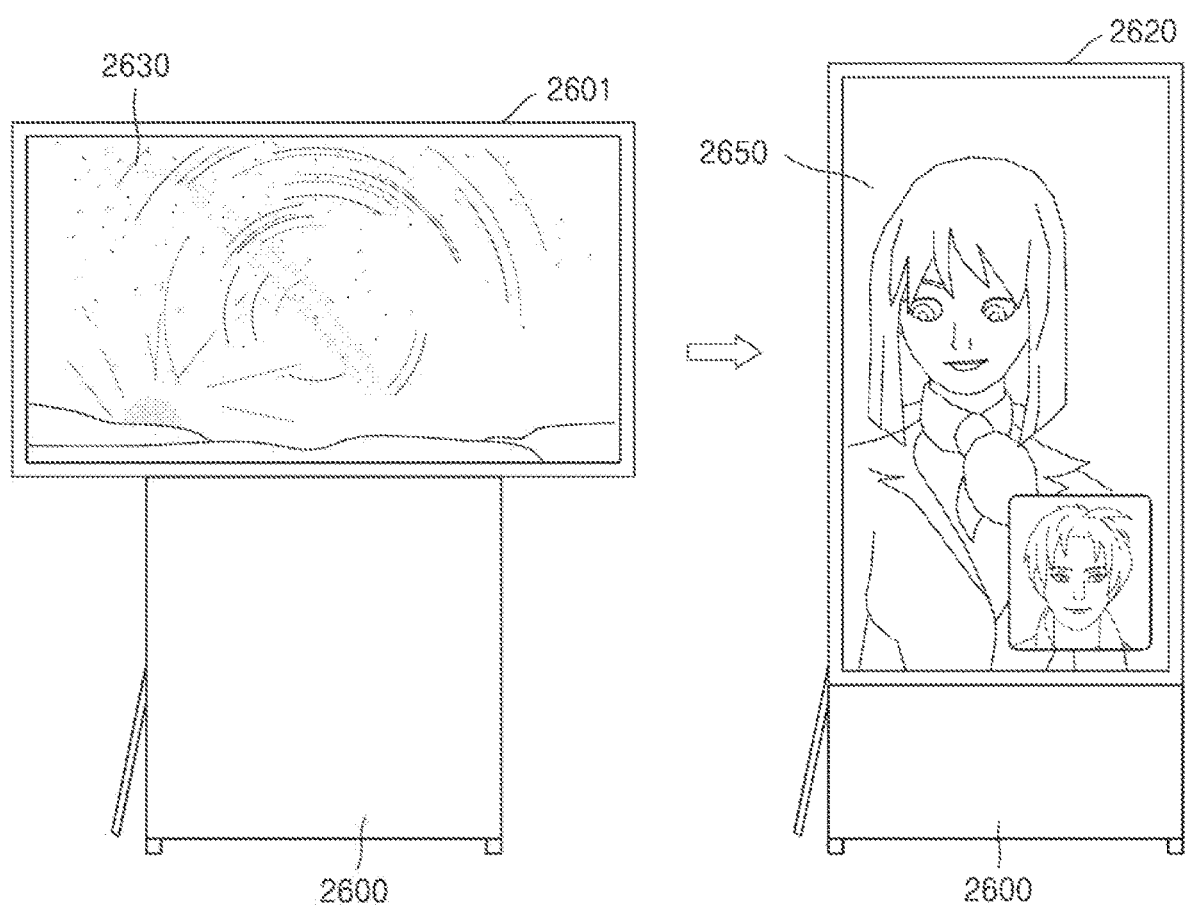
FIG. 26 is a view for explaining a position changing operation of a display performed by a display device, according to an embodiment of the disclosure.

FIG. 26 is a view for explaining a position changing operation of a display performed by a display device according to an embodiment of the disclosure.

According to an embodiment of the disclosure, the processor 310 of the display device 400 may control the position of the display 320 to move to correspond to the video calling screen image received in operation S220, based on the video calling request.

In detail, the display device 400 may be a display device capable of moving such that the display 320 rotates by 90 degrees and is arranged in a horizontal or vertical direction. The display device may be referred to as a vertical TV.

Referring to FIG. 26, a display device 2600 may correspond to the display device 120, 300, or 400 according to an embodiment of the disclosure.

Referring to FIG. 26, the display device 2600 may include a display 2601 arranged in a horizontal direction before receiving the video calling request of operation S220. Because the display 2601 is horizontally arranged before the video calling request is received, the display device 2600 may display a content playback screen image 2630.

In response to the video calling request of operation S220, the display device 2600 may adjust the position of its display so that the position of the display 2601 is changed to a position of a display 2620, based on the video calling request.

The display device 2600 may control the display 2620 arranged in a vertical direction to display a video calling screen image 2650.

As described above with reference to FIG. 26, according to an embodiment of the disclosure, an arrangement direction of the display included in the display device 2600 is adjusted according to whether the video calling screen image is output, and thus a screen image more conforming to video calling may be output.

Figure 27:
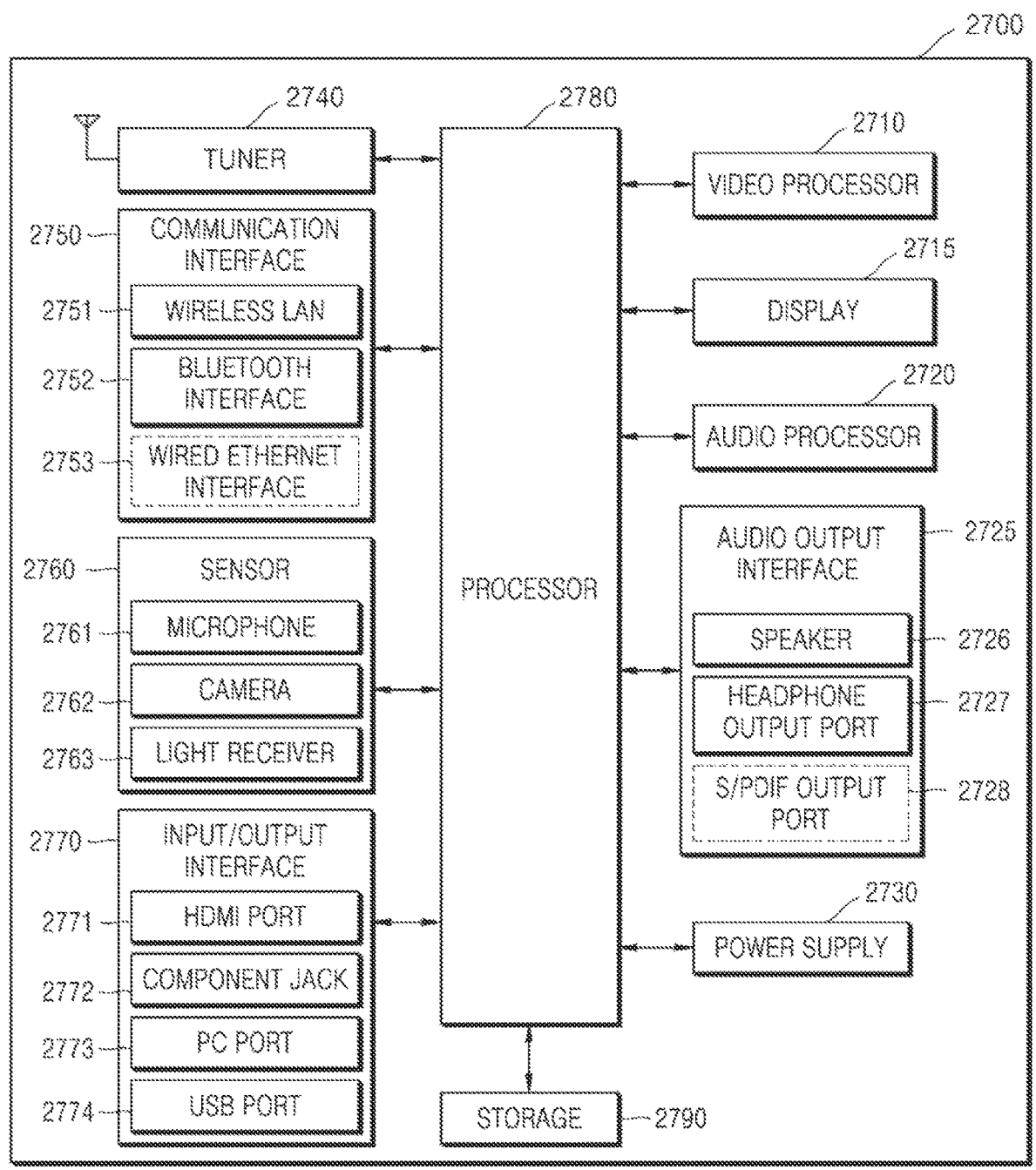
FIG. 27 is a block diagram of a display device according to an embodiment of the disclosure.

FIG. 27 is a block diagram of a display device 2700 according to an embodiment of the disclosure. The display device 2700 may correspond to any of the display devices according to the embodiments described above with reference to FIGS. 1 through 26 (for example, 120, 300, 400, or 2600). Accordingly, descriptions of the display device 2700 that are the same as those made with reference to FIGS. 1 through 26 are not repeated herein.

In detail, a processor 2780, a display 2715, a communication interface 2750, a memory 2790, a camera 2762, and an audio output interface 2725 included in the display device 2700 of FIG. 27 may correspond to the processor 310, the display 320, the communication interface 330, the memory 470, the camera 340, and the audio output interface 460 included in the display device 400 of FIG. 4, respectively.

A video processor 2710 processes video data that is received by the display device 2700. The video processor 2710 may perform a variety of image processing, such as decoding, scaling, noise filtering, frame rate transformation, and resolution transformation, on the received video data.

The processor 2780 may receive a write request with respect to the video data processed by the video processor 2710, and may control the video data to be encrypted and written to a memory device included in the processor 2780 or the memory 2790, for example, a RAM.

The display 2715 displays video included in a broadcasting signal received via a tuner 2740 on the screen thereof, under the control of the processor 2780. The display 2715 may also display content (for example, a moving picture) that is input via the communication interface 2750 or an input/output (I/O) interface 2770.

The display 2715 may also output an image stored in the memory 2790 under the control of the processor 2780. The display 2715 may include a voice UI (e.g., including a voice instruction guide) for performing a voice recognition task corresponding to voice recognition or a motion UI (e.g., including a user motion guide for motion recognition) for performing a motion recognition task corresponding to motion recognition.

An audio processor 2720 processes audio data. The audio processor 2720 may perform a variety of processing, such as decoding, amplification, or noise filtering, on the audio data. The audio processor 2720 may include a plurality of audio processing modules to process audios corresponding to a plurality of pieces of content.

The audio output interface 2725 outputs audio included in a broadcasting signal received via the tuner 2740, under the control of the processor 2780. The audio output interface 2725 may also output audio (for example, a voice or a sound) that is input via the communication interface 2750 or the I/O interface 2770. The audio output interface 2725 may also output audio stored in the memory 2790 under the control of the processor 2780. The audio output interface 2725 may include at least one of a speaker 2726, a headphone output port 2727, or a Sony/Philips Digital Interface (S/PDIF) output port 2728. The audio output interface 2725 may include a combination of the speaker 2726, the headphone output port 2727, and the S/PDIF output port 2728.

A power supply 2730 supplies power that is input from an external power source, to the internal components 2710 through 2790 of the display device 2700, under the control of the processor 2780. The power supply 2730 may also supply power that is output by one or more batteries located in the display device 2700, to the internal components 2710 through 2790 of the display device 2700, under the control of the processor 2780.

The tuner 2740 may tune and select only a frequency of a channel which the image display device 2700 wants to receive from among many radio wave components that are obtained via amplification, mixing, resonance, or the like of a wired or wireless broadcasting signal. The broadcasting signal includes audio, video, and additional information (for example, an electronic program guide (EPG)).

The tuner 2740 may receive a broadcasting signal in a frequency band corresponding to a channel number (e.g., cable broadcasting No. 506) according to a user input (for example, a control signal received from an external control device (e.g., a remote controller), e.g., a channel number input, a channel up-down input, and a channel input on an EPG screen image).

The tuner 2740 may receive a broadcasting signal from various sources, such as terrestrial broadcasting, cable broadcasting, satellite broadcasting, and Internet broadcasting. The tuner 2740 may also receive a broadcasting signal from a source such as analog broadcasting or digital broadcasting. The broadcasting signal received via the tuner 2740 is decoded (for example, audio decoding, video decoding, or additional information decoding) and is thus divided into audio, video, and/or additional information. The audio, the video, and/or the additional information may be stored in the memory 2790 under the control of the processor 2780.

The display device 2700 may include a single tuner 2740 or a plurality of tuners 2740. According to an embodiment, when a plurality of tuners 2740 are included, the plurality of tuners 2740 may output a plurality of broadcasting signals to a plurality of partial screen images included in a multi-view screen image provided to the display 2715.

The tuner 2740 may be all-in-one with the display device 2700, or implemented as a separate device (for example, a tuner that is connected to a set-top box and the I/O interface 2770) having a tuner that is electrically connected to the display device 2700.

The communication interface 2750 may connect the display device 2700 to an external device (for example, an audio device) under the control of the processor 2780. The processor 2780 may transmit/receive content to/from the external device connected via the communication interface 2750, download an application from the external device, or perform web-browsing. In detail, the communication interface 2750 may be connected to a network to receive content from an external device.

As described above, the communication interface 2750 may include at least one selected from a short-range wireless communication module, a wired communication module, and a mobile communication module.

According to an embodiment of the disclosure, the communication interface 2750 may perform communication with the server for supporting video calling, through the mobile communication module. The communication interface 2750 may perform communication with a mobile device (for example, the mobile device 500) through the short-range wireless communication module or the wired communication module.

FIG. 27 illustrates a configuration in which the communication interface 2750 includes one of a wireless local area network (LAN) 2751, interface for a Bluetooth network 2752, and interface for a wired Ethernet network 2753.

The communication interface 2750 may include a combination of one or more of the wireless LAN 2751, the Bluetooth network 2752, and the wired Ethernet network 2753. The communication interface 2750 may receive a control signal of a control device under the control of the processor 2780. The control signal may be implemented as a Bluetooth signal, a radio frequency (RF) signal, or a Wi-Fi signal.

The communication interface 2750 may further include short-range communication (for example, near field communication (NFC) or Bluetooth low energy (BLE)), in addition to the Bluetooth interface 2752.

A sensor 2760 detects a voice of a user, an image for the user, or an interaction with the user.

A microphone 2761 receives an uttered voice of the user. The microphone 2761 may transform the received voice into an electrical signal and output the electrical signal to the processor 2780. The voice of the user may include, for example, a voice corresponding to a menu or function of the display device 2700. For example, a recognition range of the microphone 2761 may be recommended to be within 4 m from the microphone 2761 to a location of the user, and may vary in correspondence to the magnitude of the voice of the user and a surrounding environment (for example, a speaker sound or ambient noise).

The microphone 2761 may be integrated with or separate from the display device 2700. The separated microphone 2761 may be electrically connected to the display device 2700 via the communication interface 2750 or the I/O interface 2770.

It will be easily understood by one of ordinary skill in the art that the microphone 2761 may be excluded according to the performance and structure of the display device 2700.

A camera 2762 receives an image (for example, consecutive frames) corresponding to a motion of the user including a gesture within a recognition range of the camera 2762. For example, the recognition range of the camera 2762 may be a distance within 0.1 to 5 m from the camera 2762 to the user. The motion of the user may include a part of the body of the user or a motion or the like of the part of the user, such as the face, a facial expression, the hand, the fist, and a finder of the user. The camera 2762 may convert a received image into an electrical signal under the control of the processor 2780 and output the electrical signal to the processor 2780.

According to an embodiment of the disclosure, the sensor 2760 may further include at least one sensor for detecting the view of the user. For example, the at least one sensor may include an NIR sensor, a ToF sensor, an SL sensor, and the like.

The processor 2780 may select a menu that is displayed on the display device 2700 by using a result of the recognition of the received motion, or perform control corresponding to the result of the motion recognition. For example, the control may be channel adjustment, volume adjustment, or indicator movement.

The camera 2762 may include a lens and an image sensor. The camera 2762 may support optical zoom or digital zoom by using a plurality of lenses and image processing. The recognition range of the camera 2762 may be variously set according to the angle of the camera 2762 and surrounding environment conditions. When the camera 2762 is comprised of a plurality of cameras, a three-dimensional (3D) still image or a 3D motion may be received by the plurality of cameras.

The camera 2762 may be integrated with or separate from the display device 2700. A separate device including the separate camera 2762 may be electrically connected to the display device 2700 via the communication interface 2750 or the I/O interface 2770.

It will be easily understood by one of ordinary skill in the art that the camera 2762 may be excluded according to the performance and structure of the display device 2700.

A light receiver 2763 receives an optical signal (including a control signal) from the external control apparatus via a light window of the bezel of the display 2715. The light receiver 2763 may receive an optical signal corresponding to a user input (for example, touch, pressing, a touch gesture, a voice, or a motion) from the control apparatus. A control signal may be extracted from the received optical signal under the control of the processor 2780.

For example, the light receiver 2763 may receive a signal corresponding to a pointing location of the control apparatus and transmit the received signal to the processor 2780. For example, when a UI screen image for receiving data or a command from a user has been output via the display 2715 and the user wants to input data or a command to the display device 2700 via the control apparatus, the user moves the control apparatus while touching a touch pad provided in the control apparatus, and, at this time, the light receiver 2763 may receive a signal corresponding to a motion of the control apparatus and transmit the received signal to the processor 2780. The light receiver 2763 may receive a signal indicating that a certain button provided on the control apparatus has been pressed, and transmit the received signal to the processor 2780. For example, when the user presses a button-type touch pad provided in the control apparatus with his or her finger, the light receiver 2763 may receive a signal indicating that the button-type touch pad has been pressed, and transmit the received signal to the processor 2780. For example, the signal indicating that the button-type touch pad has been pressed may be used as a signal for selecting one from among items.

The I/O interface 2770 receives video (for example, a moving picture), audio (for example, a voice or music), and additional information (for example, an EPG) from outside the display device 2700 under the control of the processor 2780. The I/O interface 2770 may include a High-Definition Multimedia Interface (HDMI) port 2771, a component jack 2772, a PC port 2773, or a USB port 2774. The I/O interface 2770 may include a combination of the HDMI port 2771, the component jack 2772, the PC port 2773, and the USB port 2774.

It will be understood by one of ordinary skill in the art that the structure and operation of the I/O interface 2770 may be variously implemented according to embodiments.

The processor 2780 controls an overall operation of the display device 2700 and signal transfer among the internal components of the display device 2700 and processes data. When there is an input of a user or stored preset conditions are satisfied, the processor 2780 may execute an operation system (OS) and various applications that are stored in the memory 2790.

The processor 2780 may include RAM that stores a signal or data input by an external source of the display device 2700 or is used as a memory area for various operations performed by the display device 2700, ROM that stores a control program for controlling the display device 2700, and a processor.

The processor may include a graphics processing unit (GPU) for performing video graphics processing. The processor may be implemented as a system-on-chip (SoC) including a core and the GPU. The processor may include a single core, a dual core, a triple core, a quad core, or a multiple core thereof.

The processor may include a plurality of processors. For example, the processor may be implemented by using a main processor and a sub-processor operating in a sleep mode.

The GPU generates a screen image including various objects, such as an icon, an image, and a text, by using an arithmetic unit and a rendering unit. The arithmetic unit calculates attribute values, such as a coordinate value, a shape, a size, a color, and the like, with which each object is to be displayed according to layouts of the screen image, by using a user interaction detected by a sensor. The rendering unit generates screen images of various layouts including objects, based on the attribute values calculated by the arithmetic unit. The screen images generated by the rendering unit are displayed on a display area of the display 2715.

Figure 28:
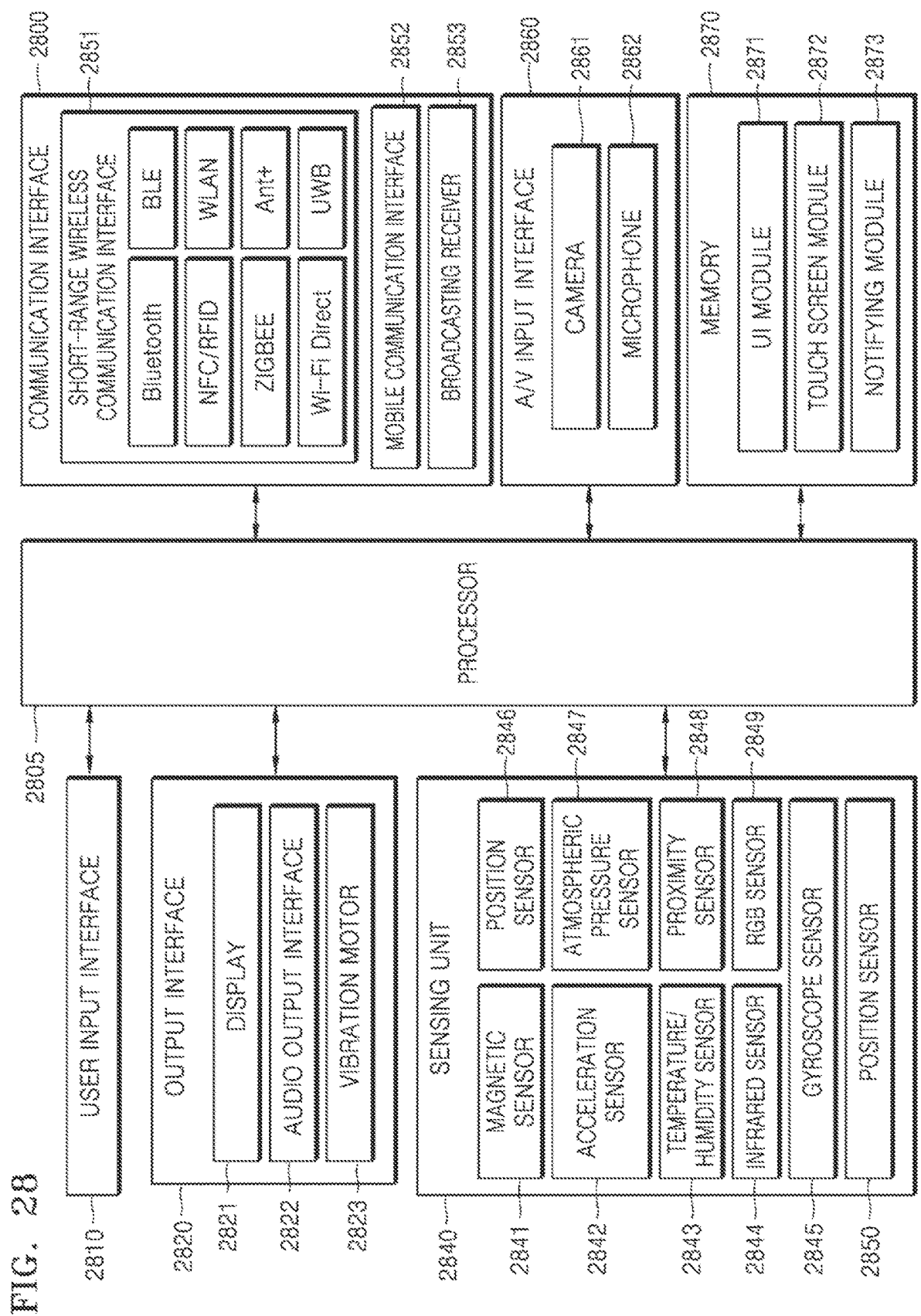
FIG. 28 is a block diagram of a mobile device according to an embodiment of the disclosure.

FIG. 28 is a block diagram of a mobile device 2800 according to an embodiment of the disclosure.

The mobile device 2800 illustrated in FIG. 28 may correspond to the mobile device 110 or 500 illustrated in FIGS. 1 through 25. In detail, a processor 2805, a user interface 2810, a display 2821, a camera 2861, and a communication interface 2830 included in the mobile device 2800 o FIG. 28 may correspond to the processor 505, the user interface 510, the display 520, the camera 540, and the communication interface 530 included in the mobile device 500 of FIG. 5, respectively.

Accordingly, descriptions of the mobile device 2800 that are the same as those of the mobile devices 110 and 1500 given above are not redundant herein.

The user interface 2810 denotes means via which the user inputs data for controlling the mobile device 2800. For example, the user interface 2810 may be, but is not limited to, a key pad, a dome switch, a touch pad (e.g., a capacitive overlay type, a resistive overlay type, an infrared beam type, an integral strain gauge type, a surface acoustic wave type, a piezo electric type, or the like), a jog wheel, or a jog switch.

The user interface 2810 may receive a user input of selecting a virtual image that is to be displayed. The user interface 2810 may also receive a user input for setting an operation of the virtual image and a user input for purchasing an item associated with the virtual image.

An output interface 2820 may output an audio signal, a video signal, or a vibration signal, and may include the display 2821, an audio output interface 2822, and a vibration motor 2823.

The display 2821 displays information that is processed by the mobile device 2800. For example, the display 2821 may display a user interface for selecting a virtual image, a user interface for setting an operation of the virtual image, and a user interface for purchasing an item of the virtual image.

When the display 2821 forms a layer structure together with a touch pad to construct a touch screen, the display 2821 may be used as an input device as well as an output device. The display 2821 may include at least one of a liquid crystal display (LCD), a thin film transistor-LCD (TFT-LCD), an organic light-emitting diode (OLED), a flexible display, a three-dimensional (3D) display, and an electrophoretic display. According to embodiments of the mobile device 2800, the mobile device 2800 may include at least two displays 2821. The at least two displays 2821 may be disposed to face each other by using a hinge.

The audio output interface 2822 outputs audio data that is received from the communication interface 2830 or stored in the memory 2870. The audio output interface 2822 may also output an audio signal (for example, a call signal receiving sound, a message receiving sound, a notification sound) related with a function of the mobile device 2800. The audio output interface 2822 may include, for example, a speaker and a buzzer.

The vibration motor 2823 may output a vibration signal. For example, the vibration motor 2823 may output a vibration signal corresponding to an output of audio data or video data (for example, a call signal receiving sound or a message receiving sound). The vibration motor 2823 may also output a vibration signal when a touch screen is touched.

The processor 2805 typically controls all operations of the mobile device 2800. For example, the processor 2805 may control the user interface 2810, the output interface 2820, a sensing unit 2840, the communication interface 2830, an audio/video (A/V) input interface 2860, and the like by executing programs stored in the memory 2870.

The sensing unit 2840 may detect the status of the mobile device 2800 or the status of the surrounding of the mobile device 2800 and may transmit information corresponding to the detected status to the processor 2805.

The sensing unit 2840 may include, but is not limited thereto, at least one selected from a magnetic sensor 2841, an acceleration sensor 2842, a temperature/humidity sensor 2843, an infrared sensor 2844, a gyroscope sensor 2845, a position sensor (e.g., a global positioning system (GPS)) 2846, a pressure sensor 2847, a proximity sensor 2848, and an RGB sensor 2849 (i.e., an illumination sensor). Functions of most of the sensors would be instinctively understood by one of ordinary skill in the art in view of their names and thus detailed descriptions thereof will be omitted herein.

According to an embodiment of the disclosure, the sensing unit 2840 may further include at least one sensor for sensing the view of the user. For example, the at least one sensor may include an NIR sensor, a ToF sensor, an SL sensor, and the like.

The communication interface 2830 may include at least one component that enables the mobile device 2800 to perform data communication with an HMD device or a server. For example, the communication interface 2830 may include a short-range wireless communication interface 2851, a mobile communication interface 2852, and a broadcasting receiver 2853.

Examples of the short-range wireless communication interface 2851 may include, but are not limited to, a Bluetooth communication interface, a Bluetooth Low Energy (BLE) communication interface, a near field communication (NFC) interface, a wireless local area network (WLAN) (e.g., Wi-Fi) communication interface, a ZigBee communication interface, an infrared Data Association (IrDA) communication interface, a Wi-Fi direct (WFD) communication interface, an ultra wideband (UWB) communication interface, and an Ant+ communication interface.

The mobile communication interface 2852 may exchange a wireless signal with at least one selected from a base station, an external terminal, and a server on a mobile communication network. Here, examples of the wireless signal may include a voice call signal, a video call signal, and various types of data according to text/multimedia messages transmission.

The broadcasting receiver 2853 receives a broadcasting signal and/or broadcasting-related information from an external source via a broadcasting channel. The broadcasting channel may be a satellite channel, a ground wave channel, or the like. According to embodiments, the mobile device 2800 may not include the broadcasting receiver 2853.

The A/V input interface 2860 inputs an audio signal or a video signal, and may include a camera 2861 and a microphone 2862. The camera 2861 may acquire an image frame, such as a still image or a moving picture, via an image sensor in a video call mode or a photography mode. An image captured via the image sensor may be processed by the processor 2805 or a separate image processor.

The image frame obtained by the camera 2861 may be stored in the memory 2870 or transmitted to the outside via the communication interface 2830. At least two cameras 2861 may be included according to embodiments of the structure of a terminal.

The microphone 2862 receives an external audio signal and converts the external audio signal into electrical audio data. For example, the microphone 2862 may receive an audio signal from an external device or a speaking person. The microphone 2862 may use various noise removal algorithms to remove noise that is generated while receiving the external audio signal.

The memory 2870 may store a program used by the processor 2805 to perform processing and control, and may also store data that is input to or output from the mobile device 2800.

The memory 2870 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk.

The programs stored in the memory 2870 may be classified into a plurality of modules according to their functions, for example, a user interface (UI) module 2871, a touch screen module 2872, and a notification module 2873.

The UI module 2871 may provide a UI, graphical user interface (GUI), or the like that is specialized for each application and interoperates with the mobile device 2800. The touch screen module 2872 may detect a touch gesture on a touch screen of a user and transmit information regarding the touch gesture to the processor 2805. The touch screen module 2872 according to an embodiment may recognize and analyze a touch code. The touch screen module 2872 may be configured by separate hardware including a controller.

to detect an actual touch or a proximate touch on a touch screen, the touch screen may internally or externally have various sensors. An example of a sensor used to detect a touch on the touch screen is a tactile sensor. The tactile sensor denotes a sensor that detects a touch by a specific object to a degree to which a human feels or more. The tactile sensor may detect various types of information, such as the roughness of a touched surface, the hardness of the touching object, and the temperature of a touched point.

Another example of a sensor used to detect the real touch or the proximity touch on the touch screen is a proximity sensor.

The proximity sensor detects the existence of an object that approaches the predetermined sensing surface or an object that exists nearby, without mechanical contact, by using an electromagnetic force or infrared rays. Examples of the proximity sensor include a transmission-type photoelectric sensor, a direct reflection-type photoelectric sensor, a mirror reflection-type photoelectric sensor, a high frequency oscillation-type proximity sensor, a capacity-type proximity sensor, a magnetic proximity sensor, and an infrared-type proximity sensor. Examples of the touch gesture of the user may include tap, touch and hold, double tap, drag, panning, flick, drag and drop, swipe, and the like.

The notification module 2873 may generate a signal for notifying that an event has been generated in the mobile device 2800. Examples of the event generated in the mobile device 2800 may include call signal receiving, message receiving, a key signal input, schedule notification, and the like. The notification module 2873 may output a notification signal in the form of a video signal via the display 2821, in the form of an audio signal via the audio output interface 2822, or in the form of a vibration signal via the vibration motor 2823.

A video calling method according to an embodiment of the disclosure may be embodied as program commands executable by various computer means and may be recorded on a computer-readable recording medium. According to an embodiment of the disclosure, a computer readable storage medium may have embodied thereon at least one program including commands for performing the above-described video calling method.

The computer-readable recording medium may include program commands, data files, data structures, and the like separately or in combinations. The program commands to be recorded on the computer-readable recording medium may be specially designed and configured for embodiments or may be well-known to and be usable by one of ordinary skill in the art of computer software. Examples of the computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program commands such as a ROM, a random-access memory (RAM), or a flash memory. Examples of the program commands are advanced language codes that can be executed by a computer by using an interpreter or the like as well as machine language codes made by a compiler.

In addition, the video calling method according to the embodiment of the disclosure may be implemented as a computer program product including a recording medium having recorded thereon a program for performing an operation of obtaining a sentence composed of multiple languages; and using a multilingual translation model, obtaining vector values corresponding to each of the words included in the sentence composed of multiple languages, converting the obtained vector values into vector values corresponding to a target language, and obtaining a sentence composed of the target language based on the vector values corresponding to a target language.

In a display device, a mobile device, a video calling method performed through the display device, and a video calling method performed through the mobile device, according to an embodiment of the disclosure, a user may perform video calling while watching a video calling screen image provided by a large screen. Accordingly, convenience of the user and a satisfaction level of the user during video calling may be increased.

While one or more embodiments of the disclosure have been described with reference to the figures, it will be understood by those of ordinary skill in the art that various changes in form and details may be made therein without departing from the spirit and scope as defined by the following claims.

What is claimed is:

1. A display device comprising:
a display;
a camera;
a communication interface configured to communicate with a mobile device; and
a processor configured to execute at least one instruction to:
after video calling between the mobile device and a counterpart device which is different from the mobile device and the display device is initiated, receive a video calling request from the mobile device, the video call request being generated based on a user input corresponding to a request for video calling through the display device and being received by the mobile device,
in response to receiving the video calling request from the mobile device, activate the camera,
obtain image data generated by the counterpart device for video calling through the communication interface,
control the display to display a video calling screen image including a first image for the counterpart device generated based on the image data and a second image obtained by the camera, and
control the communication interface to transmit image data corresponding to the second image to the mobile device such that the image data corresponding to the second image to be transmitted to the counterpart device through a server for supporting video calling.

2. The display device of claim 1, wherein the processor is further configured to execute the at least one instruction to control the image data for the counterpart device to be received from the mobile device through the communication interface.

3. The display device of claim 1, wherein the processor is further configured to execute the at least one instruction to:
detect a view of a user of the mobile device, based on the second image, and when the view of the user is changed from the display device to the mobile device, control a screen image of at least one of the display device and the mobile device to be switched in correspondence with a change in the view.

4. The display device of claim 1, wherein the processor is further configured to execute the at least one instruction to:
detect a view of a user of the mobile device, based on the second image, and when the view of the user is changed from the display device to the mobile device, deactivate the camera and control to activate a camera included in the mobile device.

5. The display device of claim 1, further comprising:
a sensor configured to detect a view of a user of the mobile device,
wherein the processor is further configured to execute the at least one instruction to:
determine whether the view of the user is changed from the display device to the mobile device, based on a result of detecting the view of the user of the mobile device by the sensor, and
based on detecting the view of the user is changed, terminate outputting of the video calling screen image and control the video calling to be performed by the mobile device.

6. The display device of claim 1, further comprising:
a sensor configured to detect a voice of a user of the mobile device,
wherein the processor is further configured to execute the at least one instruction to:
track directivity of the voice of the user of the mobile device detected by the sensor, and determine whether a view of the user of the mobile device is changed from the display device to the mobile device, based on whether the directivity of the voice of the user is changed, and
based on detecting the view of the user is changed, terminate outputting of the video calling screen image and control the video calling to be performed by the mobile device.

7. The display device of claim 1, wherein the processor is further configured to execute the at least one instruction to:
mirror an image for the counterpart device generated by the mobile device, and
control the communication interface to receive the image data from the mobile device.

8. The display device of claim 1, wherein the video calling request comprises connection information for the counterpart device, and
wherein the processor is further configured to execute the at least one instruction to control the communication interface to receive the image data from the counterpart device, based on the connection information.

9. The display device of claim 1, further comprising:
a user interface which receives a first input for requesting switch of the video calling,
wherein the processor is further configured to execute the at least one instruction to terminate outputting of the video calling screen image and control the video calling to be performed by the mobile device, based on receiving the first input.

10. The display device of claim 1, further comprising:
a user interface which receives a second input for requesting playback of content,
wherein the processor is further configured to execute the at least one instruction to terminate outputting of the video calling screen image and control a screen image corresponding to the content to be displayed, based on receiving the second input.

11. The display device of claim 1, further comprising:
a user interface which receives a second input for requesting playback of content,
wherein the processor is further configured to execute the at least one instruction to:

split a screen of the display into a first region and a second region, based on reception of the second input, control the video calling screen image to be output through the first region, and control a screen image including the content to be output through the second region.

12. The display device of claim 1, wherein the processor is further configured to execute the at least one instruction to control a position of the display to be moved to correspond to the video calling screen image, based on the video calling request.

13. A mobile device comprising:
a display;
a camera;
a user interface;
a communication interface configured to communicate with at least one of a display device and a counterpart device; and
a processor configured to execute at least one instruction to:
  initiate video calling between the mobile device and the counterpart device which is different from the display device,
  after the video calling is initiated, in response to the user interface receiving a user input of requesting a video calling screen image to be output through the display device, control the communication interface to transmit a video calling request, which is a request to perform video calling with the counterpart device, to the display device,
  control the display to output a user interface screen image for controlling execution of video calling, and
  in response to receiving image data corresponding to an image obtained by a camera included in the display device, control the communication interface to transmit the image data to the counterpart device through a server for supporting video calling.

14. The mobile device of claim 13, wherein the processor is further configured to execute the at least one instruction to, when image data for the counterpart device is received from the counterpart device, control the communication interface to transmit the image data for the counterpart device to the display device.

15. The mobile device of claim 13, wherein the processor is further configured to execute the at least one instruction to:

control the display to output the user interface screen image including a first menu for requesting the video calling screen image to be output through the display device, and based on the user interface receiving a user input for selecting the first menu, controlling the communication interface to transmit connection information for the counterpart device to the display device.

16. The mobile device of claim 15, wherein the processor is further configured to execute the at least one instruction to control the display to output the user interface screen image including a second menu and a third menu, the second menu being for requesting to switch the video calling and the third menu being for requesting termination of the video calling.

17. The mobile device of claim 16, wherein the processor is further configured to execute the at least one instruction to:

based on the user interface receiving a user input for selecting the second menu or the third menu, activate the camera and obtain a first image for a user of the mobile device, and control the display to output the video calling screen image, the video calling screen image including the first image, an image of the counterpart device.

18. A video calling method performed by a display device, the video calling method comprising:

after video calling between a mobile device and a counterpart device which is different from the mobile device and the display device is initiated, receiving a video calling request from the mobile device, the video call request being generated based on a user input corresponding to a request for video calling through the display device and being received by the mobile device;

in response to receiving the video calling request from the mobile device, activating a camera of the display device;

outputting a video calling screen image to be output through the display device, the video calling screen image including a first image for the counterpart device generated based on image data generated by the counterpart device and a second image for a user of the mobile device obtained by the camera; and transmitting image data corresponding to the second image to the mobile device such that the image data corresponding to the second image to be transmitted to the counterpart device through a server for supporting video calling.

* * * * *